US012704886B2

(12) United States Patent
Noh et al.

(10) Patent No.: US 12,704,886 B2
(45) Date of Patent: Aug. 11, 2026

(54) ELECTRONIC DEVICE INCLUDING SPEAKER MODULE

(71) Applicant: SAMSUNG ELECTRONICS CO., LTD., Suwon-si (KR)

(72) Inventors: Taewoo Noh, Suwon-si (KR); Yongyoun Kim, Suwon-si (KR); Taeeon Kim, Suwon-si (KR); Dongyoung Lee, Suwon-si (KR); Joon Heo, Suwon-si (KR); Sangyun Lee, Suwon-si (KR); Isaac Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 18/387,735

(22) Filed: Nov. 7, 2023

(65) Prior Publication Data

US 2024/0098397 A1 Mar. 21, 2024

Related U.S. Application Data

(63) Continuation of application No. PCT/KR2023/014155, filed on Sep. 19, 2023.

(30) Foreign Application Priority Data

Sep. 16, 2022 (KR) ........................ 10-2022-0118046
Nov. 17, 2022 (KR) ........................ 10-2022-0154463

(51) Int. Cl.
*G06F 1/16* (2006.01)
*H04M 1/02* (2006.01)
(Continued)

(52) U.S. Cl.
CPC ........ *G06F 1/1688* (2013.01); *H04M 1/0264* (2013.01); *H04M 1/0266* (2013.01); *H04M 1/035* (2013.01); *H04R 1/345* (2013.01)

(58) Field of Classification Search
CPC ..................................................... H04R 1/345
See application file for complete search history.

(56) References Cited

U.S. PATENT DOCUMENTS 5,825,903 A * 10/1998 Shiota .................... H04R 1/023 381/189
9,866,662 B2 1/2018 Lee et al.
(Continued)

FOREIGN PATENT DOCUMENTS

CN 112968984 A 6/2021
EP 4 262 177 A1 10/2023
(Continued)

OTHER PUBLICATIONS

International Search Report (PCT/ISA/210) issued on Dec. 29, 2023 by the International Searching Authority for International Patent Application No. PCT/KR2023/014155.
(Continued)

*Primary Examiner* — Patrick F Marinelli
(74) *Attorney, Agent, or Firm* — Sughrue Mion, PLLC

(57) ABSTRACT

An electronic device according to an embodiment of the disclosure may include a housing, a camera module disposed in the housing, a sound output module disposed in the housing to be spaced apart from the camera module, a first sound hole positioned on the front surface of the electronic device, a second sound hole which is positioned on a side surface of the electronic device and includes a dummy hole disposed to be adjacent to the sound output module and at least partially closed, and a connection hole spaced farther apart from the sound output module than the dummy hole, a sound outlet formed through the housing to allow sound generated in the sound output module to be output therethrough, and connected to the first sound hole and the second sound hole, and a sound guide part formed in the housing along a direction in which the first sound hole and the second
(Continued)

sound hole extend, and configured to connect the sound outlet, the first sound hole, and the second sound hole.

20 Claims, 21 Drawing Sheets

(51) Int. Cl.
*H04M 1/03* (2006.01)
*H04R 1/34* (2006.01)

(56) References Cited

U.S. PATENT DOCUMENTS

| | | | | |
|---|---|---|---|---|
| 10,491,987 | B2 * | 11/2019 | Huh | H05K 5/0226 |
| 11,483,637 | B2 * | 10/2022 | Moon | H04M 1/035 |
| 11,540,046 | B2 | 12/2022 | Song | |
| 11,818,526 | B2 | 11/2023 | Park et al. | |
| 12,200,153 | B2 * | 1/2025 | Yun | H04R 1/083 |
| 2007/0049357 | A1 * | 3/2007 | Daimon | H04R 1/025<br>455/575.1 |
| 2017/0026726 | A1 | 1/2017 | Kim et al. | |
| 2017/0280232 | A1 | 9/2017 | Yang | |
| 2018/0295222 | A1 * | 10/2018 | Jung | H04M 1/035 |
| 2019/0320050 | A1 | 10/2019 | Lim et al. | |
| 2021/0006876 | A1 * | 1/2021 | Moon | G06F 1/1688 |
| 2021/0243519 | A1 | 8/2021 | Kim et al. | |
| 2022/0150610 | A1 * | 5/2022 | Kim | H04M 1/03 |
| 2023/0046958 | A1 * | 2/2023 | Yun | H04R 1/28 |
| 2023/0254641 | A1 | 8/2023 | Kang et al. | |
| 2023/0291819 | A1 | 9/2023 | Jeon et al. | |
| 2023/0300520 | A1 | 9/2023 | Kim et al. | |
| 2023/0350466 | A1 * | 11/2023 | Jung | G06F 1/16 |
| 2023/0421684 | A1 | 12/2023 | Ko et al. | |
| 2024/0098397 | A1 * | 3/2024 | Noh | H04R 1/028 |

FOREIGN PATENT DOCUMENTS

| | | | |
|---|---|---|---|
| KR | 10-2017-0011795 | A | 2/2017 |
| KR | 10-2018-0040797 | A | 4/2018 |
| KR | 10-2019-0121119 | A | 10/2019 |
| KR | 10-2021-0003538 | A | 1/2021 |
| KR | 10-2021-0098696 | A | 8/2021 |
| KR | 10-2022-0067465 | A | 5/2022 |
| KR | 10-2022-0099365 | A | 7/2022 |
| KR | 10-2022-0102051 | A | 7/2022 |
| WO | 2022/045397 | A1 | 3/2022 |
| WO | 2022/169240 | A1 | 8/2022 |
| WO | 2022/191482 | A1 | 9/2022 |

OTHER PUBLICATIONS

Written Opinion (PCT/ISA/237) issued on Dec. 29, 2023 by the International Searching Authority for International Patent Application No. PCT/KR2023/014155.

* cited by examiner 1001
1002
[dB]
-70
-75
-80
-85
-90
-95
-100
-105
-110
-115
-120
100
1000
10000
20000
Hz

ELECTRONIC DEVICE INCLUDING SPEAKER MODULE

This application is a bypass continuation of International Application No. PCT/KR2023/014155, filed on Sep. 19, 2023, which claims priority from Korean Patent Application No. 10-2022-0118046, filed on Sep. 19, 2022, and Korean Patent Application No. 10-2022-0154463, filed on Nov. 17, 2022, both of which were filed in the Korean Intellectual Property Office, the disclosure of which are incorporated by reference herein in their entireties.

BACKGROUND

1. Field

The disclosure relates to various embodiments disclosed herein relate to an electronic device including a sound output module. For example, various embodiments disclosed herein may relate to a sound output module having speaker and receiver functions.

2. Description of Related Art

An electronic device may include a sound output module configured to play sounds. Increasing amounts of contents have been played through electronic devices, and users' interest in the audio performance have gradually increased accordingly.

Meanwhile, a sound hole may be designed so as to be aligned at the center of an electronic device in view of design elements such that sounds output from a speaker module are emitted out of the electronic device.

An electronic device may include a sound output module for outputting sounds. In view of the electronic component mounting structure inside the electronic device, a single sound output module may output receiver sounds and speaker sounds. The receiver sounds may be speech sounds received when the user makes a telephone call. The speaker sounds, which are different than the receiver sounds, may be generated by operations of applications such as videos and games. In such a structure, it is desirable to have separate speaker holes for both a receiver hole through which receiver sounds are emitted and a speaker hole through which speaker sounds are emitted. These speaker holes may be formed separately. The receiver hole may be positioned on the front surface of the electronic device so as to facilitate the user's call. The speaker hole may be positioned on a top lateral surface and/or a bottom lateral surface of the electronic device in view of aesthetic appearances and stereo performance.

Meanwhile, the receiver hole and the speaker hole may be connected to the sound output module through a passage. In such a case, speech sounds generated from the sound output module may be emitted not only through the receiver hole, but also through the speaker hole, thereby causing a breach of the user's privacy.

An embodiment of the disclosure may improve the phenomenon in which speech sounds generated from the sound output module are emitted through the speaker hole.

SUMMARY

Additional aspects will be set forth in part in the description which follows and, in part, will be apparent from the description, or may be learned by practice of the presented embodiments.

An electronic device according to an embodiment of the disclosure may include a housing, a camera module disposed inside of the housing, a sound output module disposed inside of the housing, the sound output module being spaced apart from the camera module, a first sound hole positioned on a front surface of the electronic device, a second sound hole which is positioned on a side surface of the electronic device and includes a dummy hole that is disposed adjacent to the sound output module and at least partially closed, and a connection hole spaced farther apart from the sound output module than the dummy hole, a sound outlet formed through the housing to allow sound generated in the sound output module to be output therethrough, the sound outlet being connected to both the first sound hole and the second sound hole, and a sound guide part formed in the housing along a direction in which the first sound hole and the second sound hole extend, and the sound guide part being configured to connect the sound outlet to both the first sound hole, and the second sound hole.

A sound-emitting structure of an electronic device according to an embodiment of the disclosure may include a sound output module disposed in a housing to be spaced apart from a camera module disposed in the housing of the electronic device, a first sound hole positioned on the front surface of the electronic device, a second sound hole which is positioned on a side surface of the electronic device and includes a dummy hole which is adjacent to the sound output module and is at least partially closed, and a connection hole spaced farther apart from the sound output module than the dummy hole, a sound outlet formed through the housing to allow sound generated in the sound output module to be output therethrough, and connected to the first sound hole and the second sound hole, and a sound guide part formed in the housing along a direction in which the first sound hole and the second sound hole extend, and configured to connect the sound outlet, the first sound hole, and the second sound hole.

According to various embodiments disclosed herein, when speech sounds are generated from a sound output module during a telephone call, the amount of sounds emitted through a speaker hole other than a receiver hole may be reduced. The reduction of the amount of sounds through a speaker hole other than a receiver hole may reduce the breach of a user's privacy.

In addition, when a speaker function is used in response to application execution, sounds generated from the sound output module may be emitted through the receiver hole and the speaker hole. Therefore, the speaker emission performance may be improved.

BRIEF DESCRIPTION OF DRAWINGS

In connection with the description of the drawings, same or similar reference numerals will be used to refer to same or similar elements.

The above and other aspects, and features of certain embodiments of the present disclosure will be more apparent from the following description taken in conjunction with the accompanying drawings, in which.

DETAILED DESCRIPTION

Figure 1:
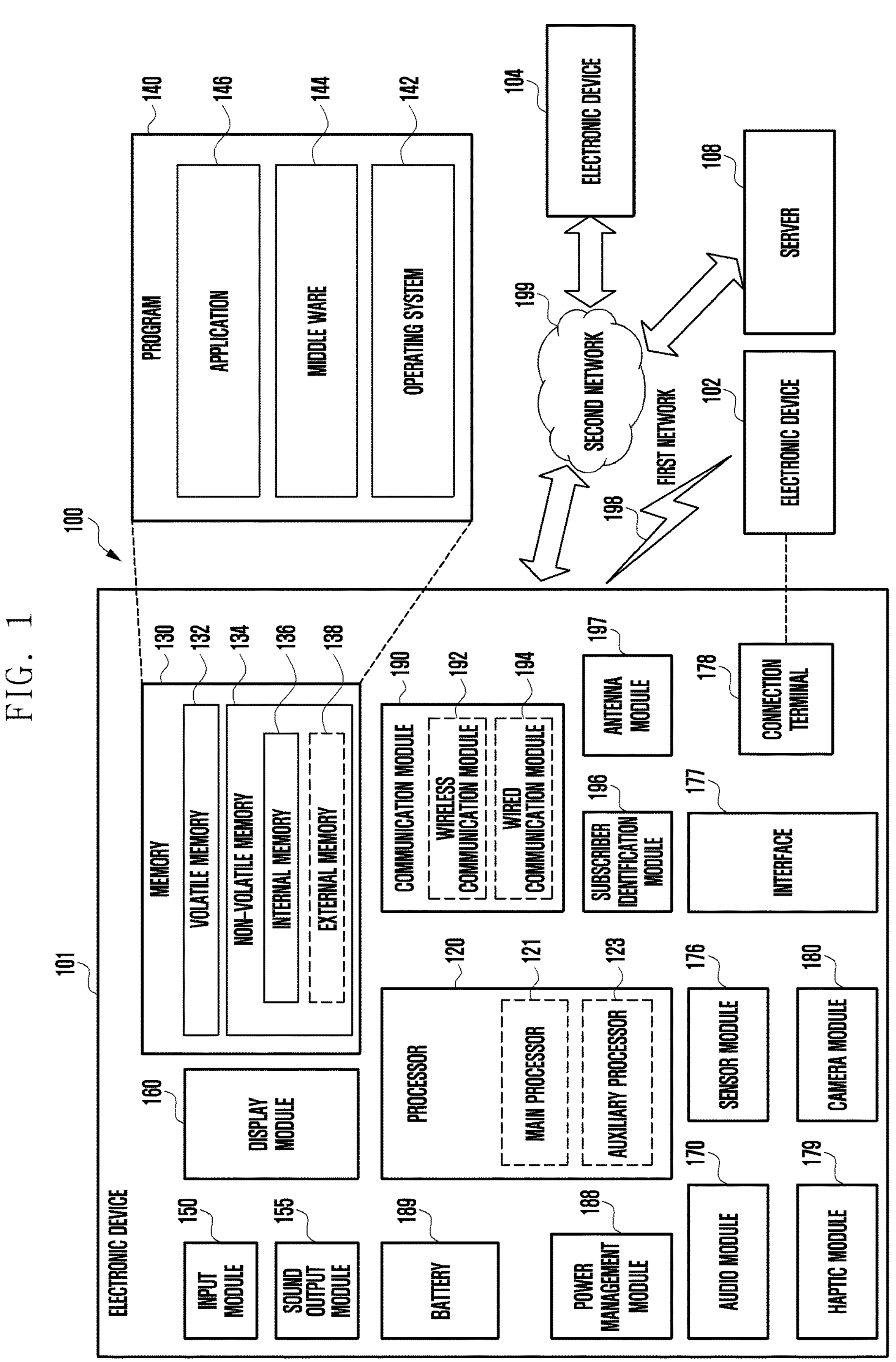
FIG. 1 is a block diagram of an electronic device in a network environment according to various embodiments.

It should be appreciated that various embodiments of the disclosure and the terms used therein are not intended to limit the technological features set forth herein to particular embodiments and include various changes, equivalents, or alternatives for a corresponding embodiment.

With regard to the description of the drawings, similar reference numerals may be used to designate similar or relevant elements. A singular form of a noun corresponding to an item may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
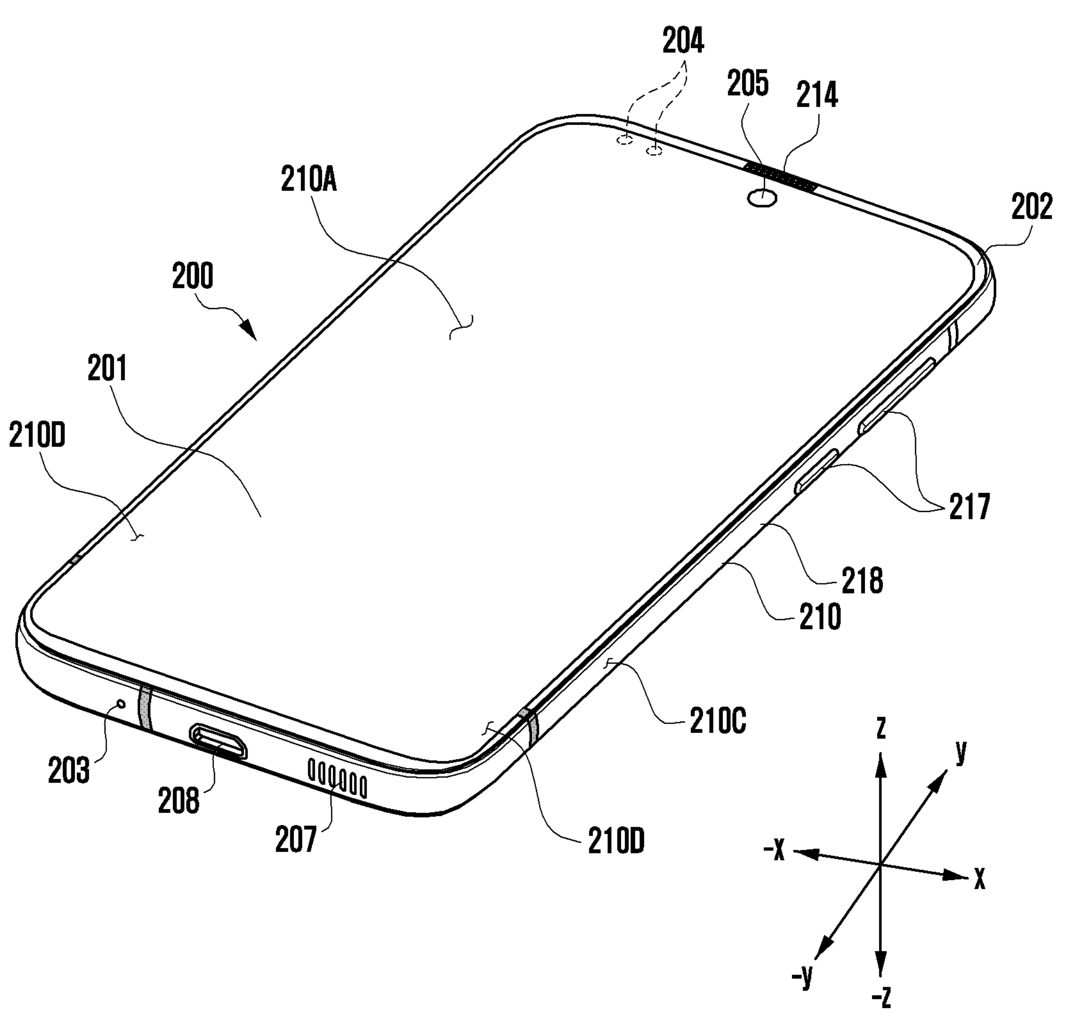
FIG. 2A is a front perspective view of an electronic device according to an embodiment of the disclosure.
Figure 2B:
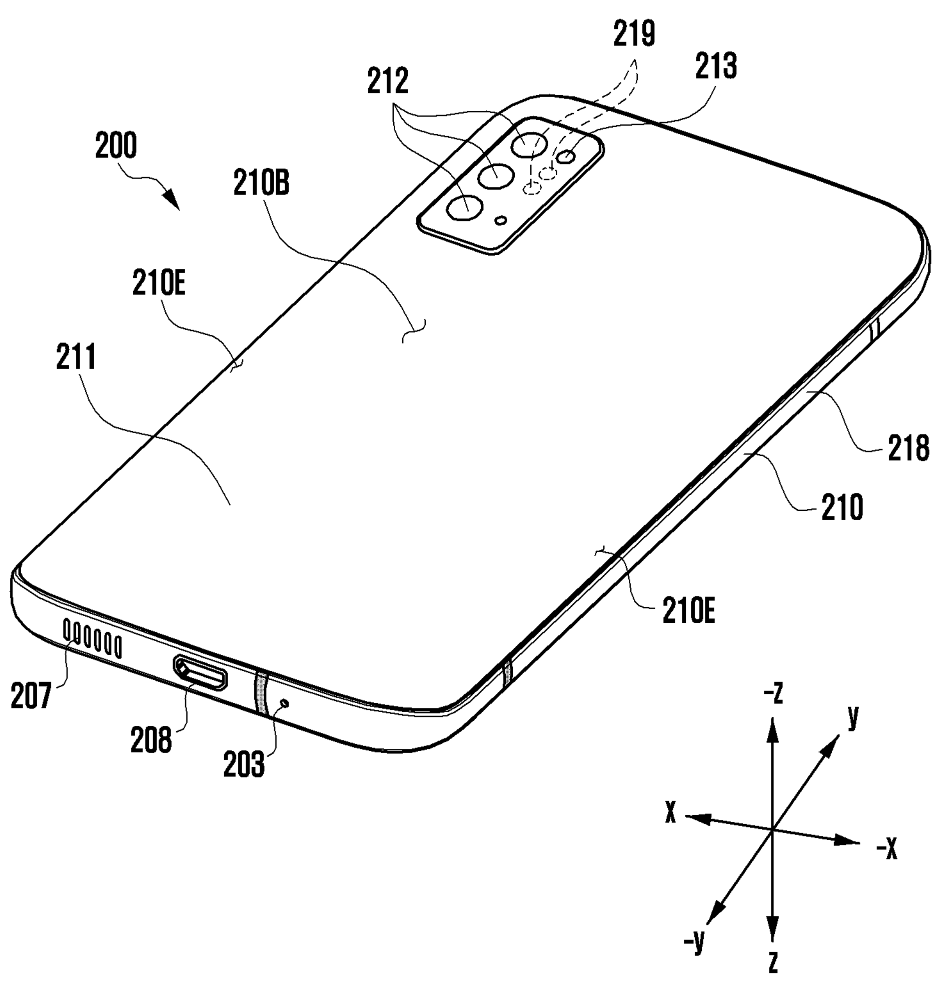
FIG. 2B is a rear perspective view of the electronic device in FIG. 2A according to an embodiment of the disclosure.

FIG. 2A is a perspective view illustrating a front surface of an electronic device 200 according to various embodiments of this disclosure. FIG. 2B is a perspective view illustrating a rear surface of the electronic device 200 of FIG. 2A according to various embodiments of this disclosure.

The electronic device 200 of FIGS. 2A and 2B may be at least partially similar to the electronic device 101 of FIG. 1 or may include other components of the electronic device.

With reference to FIGS. 2A and 2B, the electronic device 200 according to an embodiment may include a housing 210 including a first surface (or front surface) 210A, a second surface (or rear surface) 210B, and a side surface 210C enclosing a space between the first surface 210A and the second surfaces 210B. In another embodiment (not illustrated), the housing 210 may refer to a structure forming a portion of the first surface 210A, the second surface 210B, and the side surface 210C. According to an embodiment, the first surface 210A may be formed by a front plate 202 (e.g., a polymer plate or a glass plate including various coating layers) having at least a portion substantially transparent. The second surface 210B may be formed by a substantially opaque rear plate 211. The rear plate 211 may be formed by, for example, coated or colored glass, ceramic, polymer, metal (e.g., aluminum, stainless steel (STS), or magnesium), or a combination of at least two of the above materials. The side surface 210C may be coupled to the front plate 202 and the rear plate 211 and be formed by a side bezel structure (or "side member") 218 including a metal and/or a polymer. In some embodiments, the rear plate 211 and the side bezel structure 218 may be integrally formed and include the same material (e.g., a metal material such as aluminum).

In the illustrated embodiment, the front plate 202 may include a first area 210D extended seamlessly by bending from the first surface 210A toward the rear plate at both ends of a long edge of the front plate. In the illustrated embodiment (see FIG. 2B), the rear plate 211 may include a second area 210E extended seamlessly from the second surface 210B toward the front plate at both ends of a long edge. In some embodiments, the front plate 202 or the rear plate 211 may include only one of the first area 210D or the second area 210E. In some embodiments, the front plate 202 does not include the first area and the second area, but may include only a flat plane disposed parallel to the second surface 210B. In the above embodiments, when viewed from the side surface of the electronic device, the side bezel structure 218 may have a first thickness (or width) at the side surface not including the first area 210D or the second area 210E and have a second thickness thinner than the first thickness at a side surface including the first area or the second area.

According to an embodiment, the electronic device 200 may include at least one of a display 201, an input device 203, sound holes 207 and 214, sensor modules 204 and 219, camera modules 212 and 213, a key input device 217, an indicator (not illustrated), or a connector hole 208. In some embodiments, the electronic device 200 may omit at least one (e.g., the key input device 217 or the indicator) of the components or may additionally include other components.

The display 201 may be exposed, for example, through a portion of the front plate 202. In some embodiments, at least a portion of the display 201 may be exposed through the front plate 202 forming the first area 210D of the first surface 210A and the side surface 210C. The display 201 may be coupled to or disposed adjacent to a touch sensing circuit, a pressure sensor capable of measuring the intensity (pressure) of a touch, and/or a digitizer that detects a magnetic field type stylus pen. In some embodiments, at least a portion of the sensor modules 204 and 219, and/or at least a portion of the key input device 217 may be disposed in the first area 210D and/or the second area 210E.

The input device 203 may include a microphone. In some embodiments, the input device 203 may include a plurality of microphones disposed to detect a direction of a sound. The sound holes 207 and 214 may be connected to a speaker. In some embodiments, the microphone, the speakers, and the connector hole 208 may be disposed inside of the electronic device 200 and be exposed to an external environment through at least one of the sound holes 207 and 214 formed in the housing 210. In some embodiments, the sound holes 207 and 214 formed in the housing 210 may be commonly used for a microphone and speakers. In some embodiments, the sound output device may include a speaker (e.g., piezo speaker) that operates without a hole formed in the housing 210.

The sensor modules 204 and 219 may generate electrical signals or data values corresponding to an internal operating state of the electronic device 200 or an external environmental state. The sensor modules 204 and 219 may include, for example, a first sensor module 204 (e.g., proximity sensor) and/or a second sensor module (not illustrated) (e.g., fingerprint sensor) disposed at the first surface 210A of the housing 210, and/or a third sensor module 219 (e.g., HRM sensor) disposed at the second surface 210B of the housing 210. The third sensor module 219 may be disposed on a surface different from the second surface 210B of the housing 210. The fingerprint sensor may be disposed at the first surface 210A of the housing 210. The fingerprint sensor (e.g., ultrasonic fingerprint sensor or optical fingerprint sensor) may be disposed under the display 201 of the first surface 210A. The electronic device 200 may further include a sensor module (not illustrated), for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 212 and 213 may include a first camera device (not illustrated) disposed at the first surface 210A of the electronic device 200, and a second camera device 212 disposed at the second surface 210B of the electronic device 200, and/or a flash 213. The camera module 212 may include one or more lenses, an image sensor, and/or an image signal processor. The flash 213 may include, for example, a light emitting diode or a xenon lamp. In some embodiments, two or more lenses (wide-angle and telephoto lenses) and image sensors may be disposed at one surface of the electronic device 200.

The key input device 217 may be disposed at the side surface 210C of the housing 210. In another embodiment, the electronic device 200 may not include some or all of the above-mentioned key input devices 217 and the not included key input device 217 may be implemented into other forms of soft keys or the like on the display 201. In another embodiment, the key input device 217 may be implemented using a pressure sensor included in the display 201.

The indicator may be disposed, for example, at the first surface 210A of the housing 210. The indicator may provide, for example, information of the electronic device 200 in the form of light. In another embodiment, the light emitting device may provide, for example, a light source interworked with an operation of the camera module 212. The indicator may include, for example, a light emitting diode (LED), an infrared rays (IR) LED, and/or a xenon lamp.

The connector hole 208 may include a first connector hole 208 capable of receiving a connector (e.g., USB connector or interface connector port module (IF module)) for transmitting and receiving power and/or data to and from an external electronic device and/or a second connector hole (or earphone jack) capable of receiving a connector for transmitting and receiving an audio signal to and from an external electronic device. The first connector hole 208 may also be capable of receiving a connector for transmitting and receiving an audio signal to and from an external electronic device.

Some of the camera modules 212, some of the sensor modules 204 and 219, or indicators may be disposed to be exposed through the display 201. For example, the camera module, the sensor module 204, or the indicator may be disposed to contact an external environment through an opening or a transparent area 205 perforated from an internal space of the electronic device 200 to the front plate 202 of the display 201. According to an embodiment, the camera hole 205 in which the display 201 and the camera module face each other may be formed in a transmission area having a predetermined transmittance as a part of an area displaying contents. According to an embodiment, the transmission area may be formed to have a transmittance in a range of about 5% to about 20%. Such a transmission area may include an area overlapping an effective area (e.g., view angle area) of the camera module through which light for generating an image by an image sensor passes. For example, the transmission area of the display 201 may include an area having a lower pixel density than that of the periphery. For example, the transmission area may replace the opening. For example, the camera module may include a under display camera (UDC). In another embodiment, some sensor modules 204 may be disposed to perform a function thereof without being visually exposed through the front plate 202 in an internal space of the electronic device. For example, in this case, the area of the display 201 facing the sensor module may not need a perforated opening.

Figure 3:
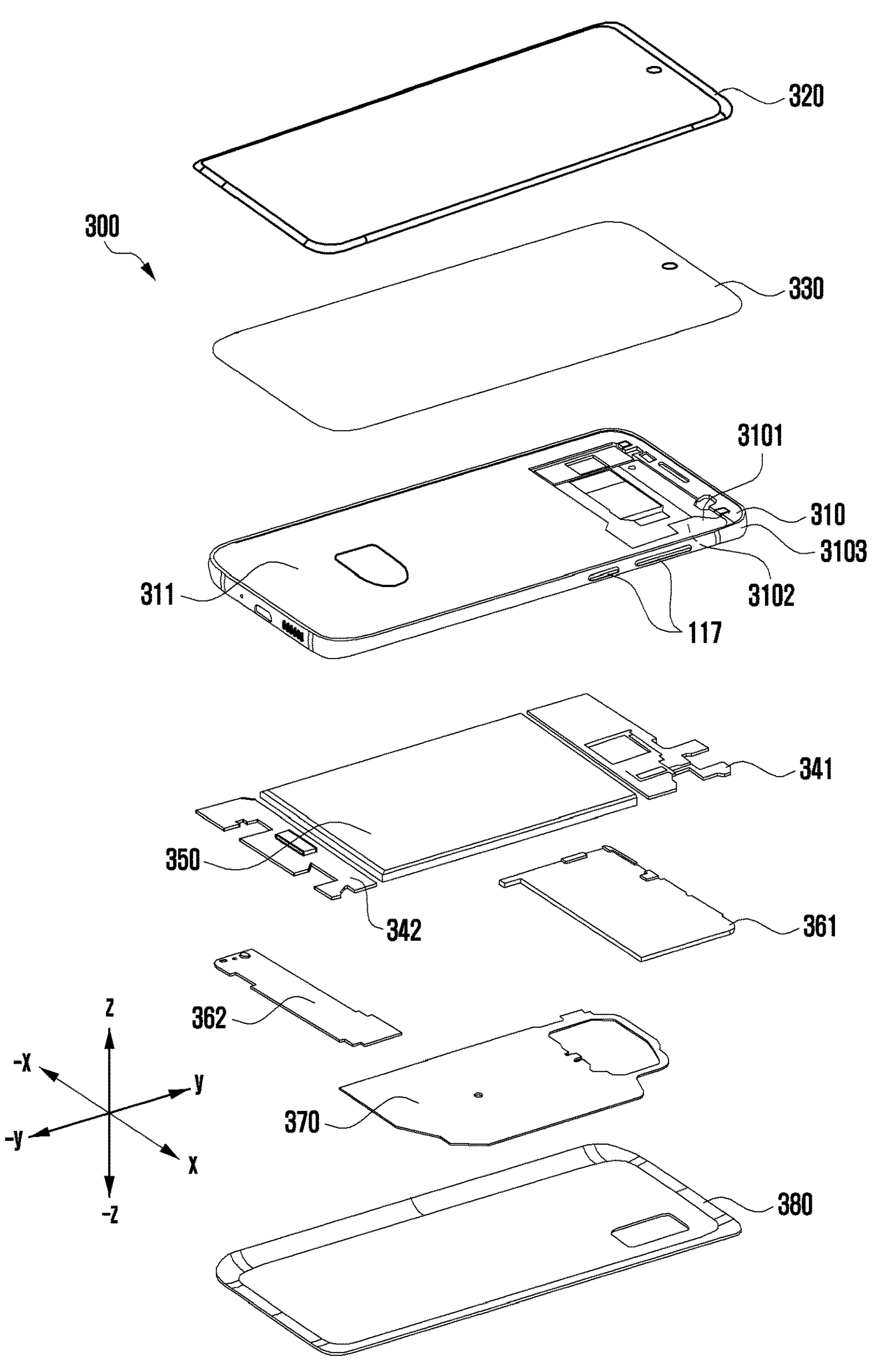
FIG. 3 is an exploded perspective view of an electronic device according to an embodiment of the disclosure.

FIG. 3 is an exploded perspective view illustrating an electronic device according to various embodiments of this disclosure.

An electronic device 300 of FIG. 3 may be at least partially similar to the electronic device 101 of FIG. 1 and/or the electronic device 200 of FIG. 2A or may include other components of the electronic device.

With reference to FIG. 3, the electronic device 300 (e.g., the electronic device 101 of FIG. 1 or the electronic device 200 of FIG. 2) may include a side member 310 (e.g., the side bezel structure 218 of FIG. 2A), a support member 311 (e.g., bracket or support member), a front cover 320 (e.g., the front plate 202 of FIG. 2A), a display 330 (e.g., the display 201 of FIG. 2A), at least one substrate 341 and 342 (e.g., printed circuit board (PCB), flexible PCB (FPCB), or rigid-flexible PCB (R-FPCB)), a battery 350, at least one additional support member 361 and 362 (e.g., rear case), an antenna 370, and a rear cover 380 (e.g., the rear plate 211 of FIG. 2). In some embodiments, the electronic device 300 may omit at least one (e.g., the support member 311 or at least one additional support member 361 and 362) of the components or may additionally include other components. At least one of the components of the electronic device 300 may be the same as or similar to at least one of the components of the electronic device 101 of FIG. 1 or the electronic device 200 of FIG. 2A, and a repeated description may be omitted.

According to various embodiments, the side member 310 may include a first surface 3101 facing in a first direction (e.g., z-axis direction), a second surface 3102 facing in a direction opposite to the first surface 3101, and a side surface 3103 enclosing a space (e.g., an internal space 4001) between the first surface 3101 and the second surface 3102. According to an embodiment, at least a portion of the side surface 3103 may form an external shape of the electronic device. In this embodiment, at least a portion of the battery 350 and/or at least a portion of the first substrate 341 and the second substrate may be disposed in an internal space of the side surface 3103. According to an embodiment, the support member 311 may be disposed to extend from the side member 310 toward the internal space (e.g., the internal space 4001 of FIG. 4) of the electronic device 300. In some embodiments, the support member 311 may be disposed separately from the side member 310. According to an embodiment, the side member 310 and/or the support member 311 may be made of, for example, a metal material and/or a non-metal material (e.g., polymer). According to an embodiment, the support member 311 may support at least a portion of the display 330 through the first surface 3101 and be disposed to support at least a portion of the battery 350 and/or at least one substrate 341 and 342 through the second surface 3102. According to an embodiment, the at least one substrate 341 and 342 may include a first substrate 341 (e.g., main substrate) disposed at one side and a second substrate 342 (e.g., sub substrate) disposed at the other side based on the battery 350 in the internal space of the electronic device 300. According to an embodiment, the first substrate 341 and/or the second substrate 342 may include a processor, a memory, and/or an interface. According to an embodiment, the processor may include, for example, one or more of a central processer, an application processor, a graphic processer, an image signal processor, a sensor hub processor, or a communication processor. According to an embodiment, the memory may include, for example, a volatile memory or a non-volatile memory. According to an embodiment, the interface may include, for example, a high definition multimedia interface (HDMI), a universal serial bus (USB) interface, a secure digital (SD) card interface, and/or an audio interface. The interface may, for example, electrically or physically connect the electronic device 300 to an external electronic device, and include a USB connector, an SD card/multimedia connect (MMC) connector, or an audio connector. According to an embodiment, the battery 350 is a device for supplying power to at least one component of the electronic device 300 and may include, for example, a non-rechargeable primary cell, a rechargeable secondary cell, or a fuel cell. At least a portion of the battery 350 may be disposed on a substantially same plane as, for example, at least one of the substrates 341 and 342. According to an embodiment, the battery 350 may be disposed in a way that it is embedded in the electronic device 300. In some embodiments, the battery 350 may be detachably disposed from the electronic device 300.

According to various embodiments, the antenna 370 may be disposed between the rear cover 380 and the battery 350. The antenna 370 may include, for example, a near field communication (NFC) antenna, a wireless charging antenna, and/or a magnetic secure transmission (MST) antenna. The antenna 370 may, for example, perform short range communication with an external device or wirelessly transmit and receive power required for charging. In some embodiments, the antenna may be formed by some of the side member 310 or a combination of the side member 310 and the support member 311. In some embodiments, the electronic device 300 may further include a digitizer for detecting an external electronic pen.

Figure 4:
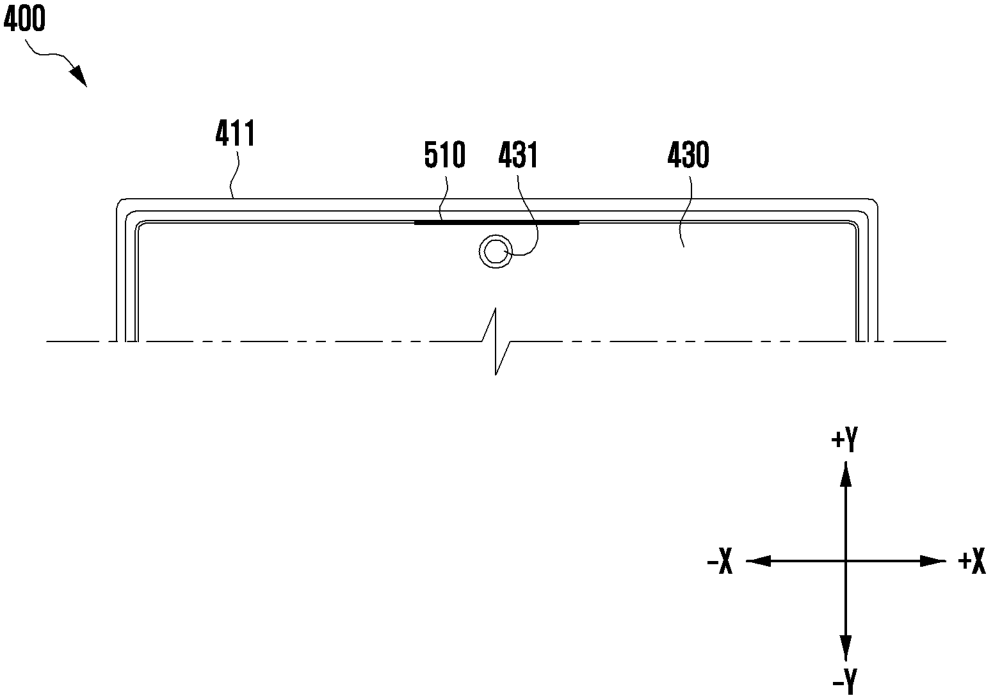
FIG. 4 is a view showing a part of an electronic device according to an embodiment of the disclosure.
Figure 5A:
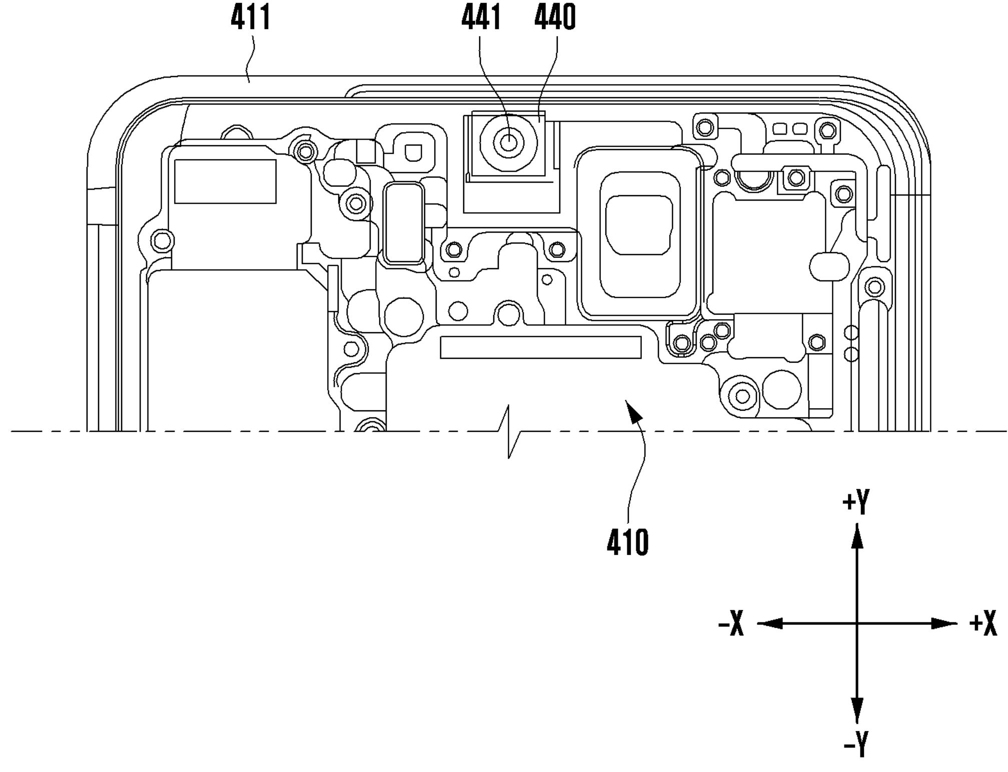
FIG. 5A is a view when a housing of an electronic device according to an embodiment disclosed in the document is seen in the front direction of the electronic device.
Figure 5B:
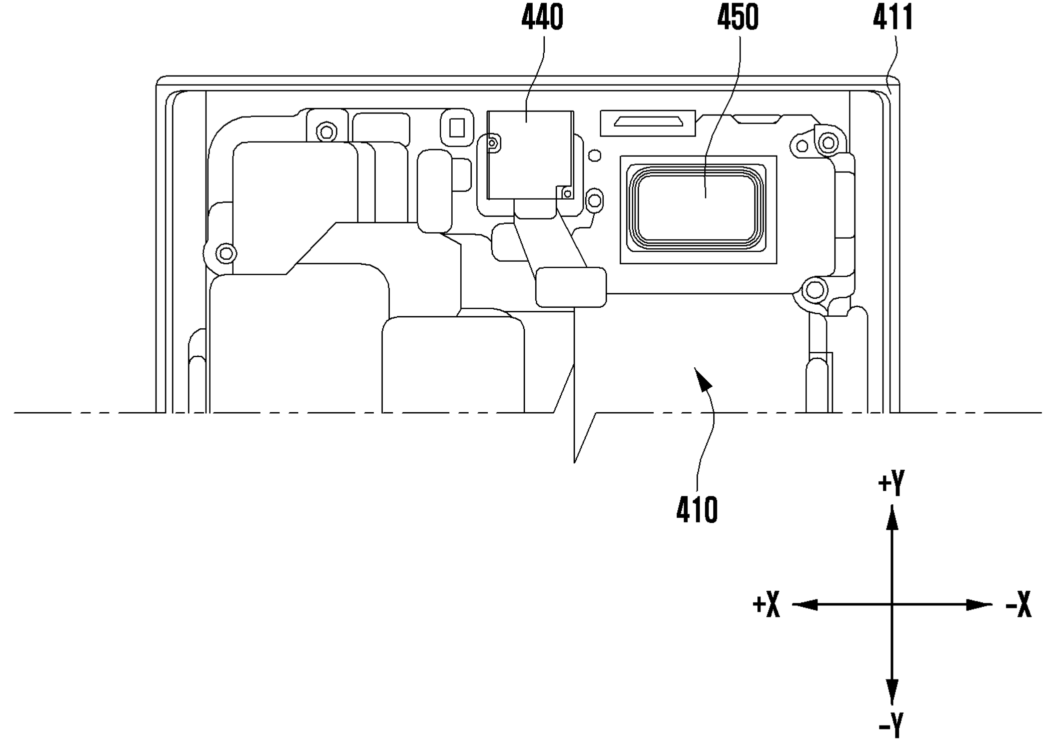
FIG. 5B is a view when a housing of an electronic device according to an embodiment disclosed in the document is seen in the rear direction of the electronic device.
Figure 6A:
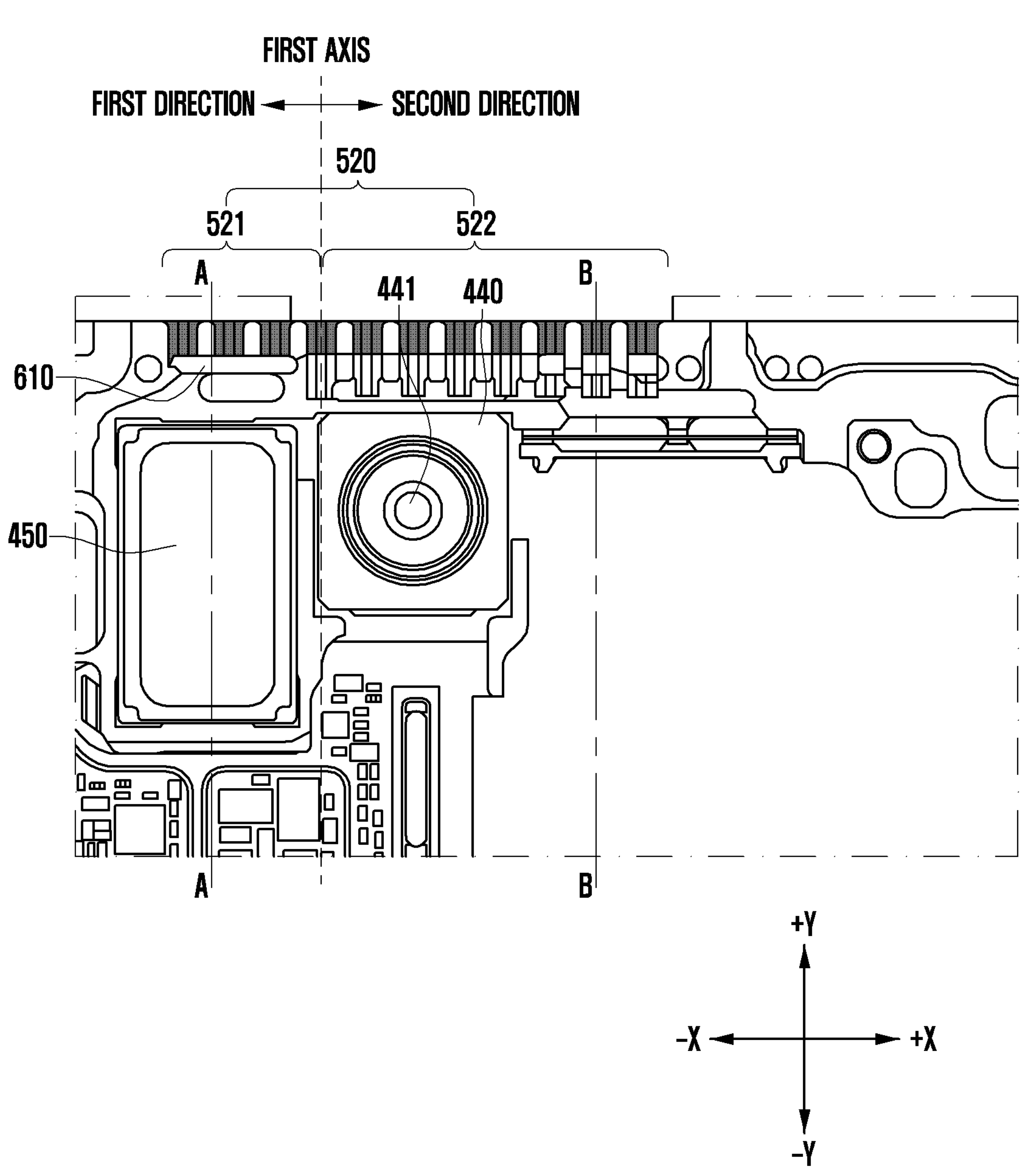
FIG. 6A is a plan view when the upper end of a housing according to an embodiment disclosed in the document is seen from the front surface of an electronic device.
Figure 6B:
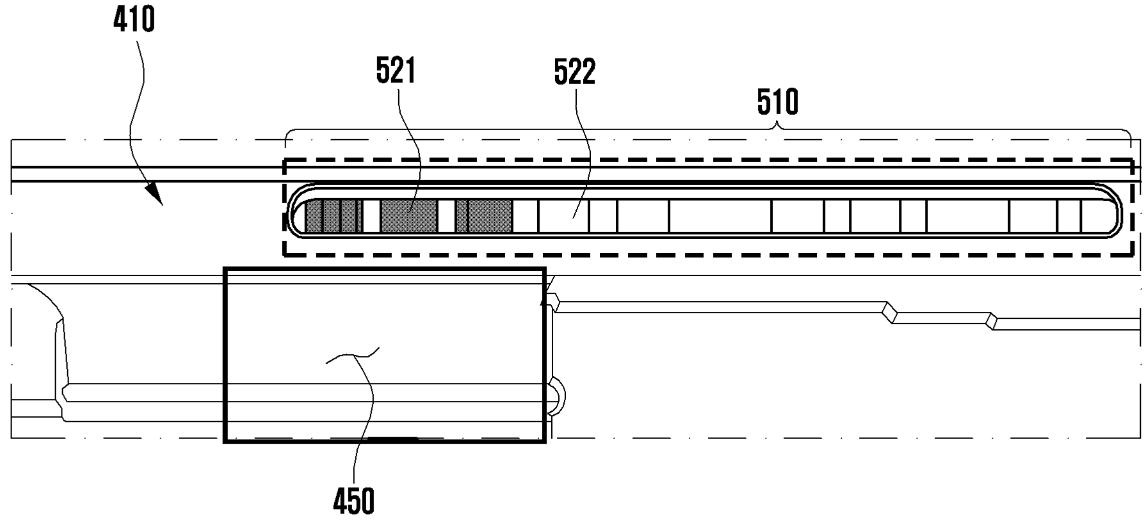
FIG. 6B is an enlarged view of a first sound hole seen from the front surface of an electronic device according to an embodiment of the disclosure.
Figure 6C:
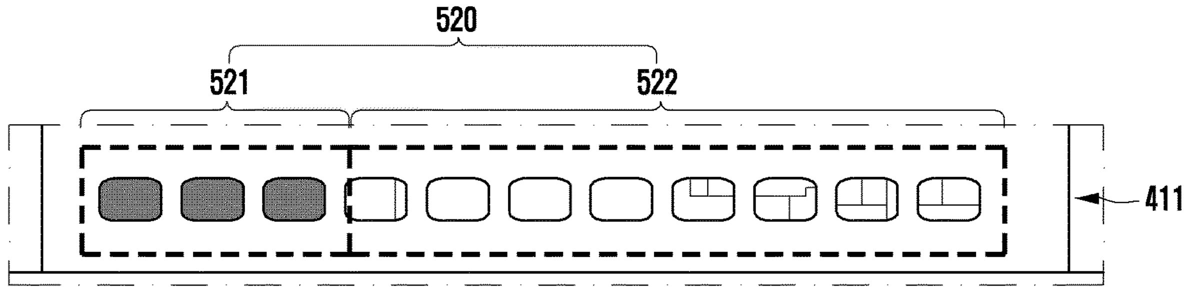
FIG. 6C is a view showing a state when a second sound hole is seen from the upper end of the electronic device according to an embodiment of the disclosure.

FIG. 4 is a view showing a part of an electronic device according to an embodiment of this disclosure. FIG. 5A is a view when a housing of an electronic device according to an embodiment of this disclosure is seen in the front direction of the electronic device. FIG. 5B is a view when a housing of an electronic device according to an embodiment of this disclosure is seen in the rear direction of the electronic device. FIG. 6A is a plan view when the upper end of a housing according to an embodiment of this disclosure is seen from the front surface of an electronic device. FIG. 6B is an enlarged view of a first sound hole seen from the front surface of an electronic device according to an embodiment of this disclosure. FIG. 6C is a view showing a state when a second sound hole is seen from the upper end of the electronic device according to an embodiment of this disclosure.

In an embodiment of this disclosure, an electronic device 400 illustrated in FIG. 4 may be an example of the electronic device 101 illustrated in FIG. 1, the electronic device 200 illustrated in FIGS. 2A and 2B, and/or the electronic device 300 illustrated in FIG. 3. Although the electronic device 400 to be described below will be described based on the electronic devices having a bar shape illustrated in FIG. 2A, FIG. 2B, and FIG. 3, in some embodiments, the electronic device 400 may be one of a foldable electronic device, a slidable electronic device, a stretchable electronic device and/or a rollable electronic device. In addition, in connection with elements identical or similar to the elements described in FIG. 1, FIG. 2A, FIG. 2B, and FIG. 3, same or similar reference numerals may be used to refer to the same members, except when otherwise indicated.

In an embodiment, the electronic device 400 may include a housing assembly which supports various mechanical members and electrical members constituting the electronic device 400, and of which at least a part constitutes the exterior (e.g., the lateral bezel structure 218 in FIG. 2A) of the electronic device 400. Here, the electrical members may be understood as a generic term for elements for transmitting or receiving an electrical signal. The housing assembly may be configured as a single element or may be configured in a manner in which multiple elements are combined. For example, the housing assembly may be a support member 412 disposed inside the housing 410.

In an embodiment, a housing assembly (e.g., the support member 412) may be formed of various materials. In case that the housing assembly is configured by multiple elements, the elements may be formed of different materials. For example, the housing assembly may be formed of various materials such as a synthetic resin material, a metallic material, and a composite material.

In an embodiment, the support member 412 for supporting various mechanical members and electronic components may be disposed in the housing 410. In an embodiment, the support member 412 may support at least one of a sound output module 450 and a camera module 440. In an embodiment, the support member 412 may include a groove for accommodating at least one of the sound output module 450 and the camera module 440. In an embodiment, the support member 412 may be formed separately from the housing 410 and then be assembled to the housing 410. In some embodiments, the support member 412 may be formed integrally with the housing 410 to partition the inner space of the housing 410. In an embodiment, the support member 412 may form a sound guide part 550 for connecting the sound output module 450, a first sound hole 510, and a second sound hole 520. For example, the sound guide part 550 may be a space formed through the support member 412 and a lateral frame 411 constituting the side exterior of the housing 410.

In an embodiment, at least a part of the housing 410 may constitute the exterior of the electronic device 400. The housing 410 may include a portion for supporting a display module 430 of the electronic device 400.

In an embodiment, the housing 410 may be formed of various materials. For example, the housing 410 may be formed of a metallic material and/or a non-metallic material. Here, the metal material of the housing 410 may include an alloy of aluminum, stainless steel (STS or SUS), iron, magnesium, and/or titanium, and the non-metallic material of the housing 410 may include synthetic resin, ceramic, and/or engineering plastic. In addition, the housing 410 may be formed by various methods such as injection molding or die casting.

In an embodiment, referring to FIG. 4 and FIG. 5A, the camera module 440 may be disposed such that a lens part 441 of the camera module 440 (e.g., the camera module 180 in FIG. 1) is aligned with the center of the width direction (e.g., the X-axis direction in FIG. 5A) of the housing 410. Referring to FIG. 4, the display module 430 may include a camera hole 431 facing the lens part 441 of the camera module 440. The camera hole 431 may be a portion which allows external light that has passed through the camera module 440 to be incident on the lens part 441 of the camera module 440. At least a part of a portion thereof corresponding to the camera hole 431 may be configured to be transparent.

According to an embodiment, as illustrated in FIG. 5A and FIG. 5B, the sound output module 450 may be disposed in the housing 410 of the electronic device 400. In an embodiment, referring to FIG. 5A and FIG. 5B, the sound output module 450 may be disposed at the upper end (e.g., a portion positioned in the +Y-axis direction based on FIG. 5A) of the housing 410. In an embodiment, the sound output module 450 may refer to a component for outputting sound according to a command of the processor 120 when an application is executed. In an embodiment, when an application runs, the sound output module 450 may include a speaker for outputting sound and/or a receiver for outputting call sound. In an embodiment, when calling, the sound output module 450 may output sound of a receiver, which is call sound, and may output sound of a speaker when an application, such as a video or a game, runs. Hereinafter, for the convenience of explanation, the sound output from the sound output module 450 according to an operation of a call application will be defined and described as "the receiver sound", and the sound output from the sound output module 450 when a speaker function is normally activated, such as a speaker mode used for a video, game, and call, will be defined and described as "the speaker sound".

Referring to FIG. 5B, in various embodiments of this disclosure, the sound output module 450 (e.g., the sound output module 155 in FIG. 1) of the electronic device 400 may be disposed in a first direction (e.g., the −X-axis direction in FIG. 5B and FIG. 6A) with respect to the camera module 440. In case that the lens part 441 of the camera module 440 is disposed to be aligned with the center of the width direction of the housing 410, the sound output module 450 may be disposed eccentrically with respect to the center of the width direction of the housing 410.

Referring to FIG. 4 and FIG. 6B, the electronic device 400 may include the first sound hole 510 (e.g., the sound holes 214 and 207 in FIG. 2A) for connecting the outside of the electronic device 400 and the inside space of the electronic device 400. The first sound hole 510 may include a slit-shaped groove positioned between the housing 410 and the display module 430. For example, the first sound hole 510 may be a slit-shaped hole positioned between the display module 430 and the lateral frame 411 of the housing 410. The first sound hole 510 having the slit shape may be formed in a shape extending in a predetermined direction (e.g., the X-axis direction in FIG. 4). For example, multiple holes constituting the first sound hole 510 may be arranged in a direction parallel to the width direction of the electronic device 400. In some embodiments, in order to form the first sound hole 510 having the slit shape, at least a part of the housing 410 and the display module 430 may be formed to be concave. In some cases, the first sound hole 510 having the slit shape may be provided by a height difference formed between the housing 410 and the display module 430. In another embodiment, the first sound hole 510 may be formed in display module 430. For example, the first sound hole 510 may be formed at the upper end of the display module 430 so that the sound output from the sound output module 450 can be emitted to the outside of the electronic device 400.

In an embodiment, the first sound hole 510 may be positioned such that the center thereof with respect to the width direction (e.g., the X-axis direction in FIG. 4) is aligned with the camera hole 431. In other words, the first sound hole 510 may be formed symmetrically with respect to the camera hole 431. The camera hole 431 may be disposed to be aligned with the center of the housing 410. Thus since the first sound hole 510 is aligned with the camera hole 431, the first sound hole 510 may be formed to be aligned with the center of the housing 410.

In an embodiment, a foreign substance prevention member including a mesh may be disposed in the first sound hole 510 to prevent the inflow of external foreign substances through the first sound hole 510. The foreign substance prevention member may be disposed in an inlet portion of the first sound hole 510 or inside the first sound hole 510.

According to an embodiment, as illustrated in FIG. 6A and FIG. 6C, the electronic device 400 may include the second sound hole 520 (e.g., the sound holes 214 and 207 in FIG. 2A) for connecting the outside of the electronic device 400 and the inner space of the electronic device 400. The second sound hole 520 may include a plurality of holes (e.g., the sound hole 207 in FIG. 2A) formed on the side surface of the housing 410. The plurality of holes of the second sound hole 520 may be arranged in a direction parallel to the width direction (e.g., the X-axis direction based on FIG. 6C) of the electronic device 400. In an embodiment, the second sound hole 520 may be disposed to surround the side surface of the housing 410, and may be formed through the lateral frame 411 (e.g., the lateral bezel structure 218 in FIG. 2A) constituting the exterior of the electronic device 400. For example, the plurality of holes of the second sound hole 520 may be positioned to extend in the width direction (e.g., the X-axis direction in FIG. 4) of the electronic device 400, in the lateral frame 411. In an embodiment, the second sound hole 520 may be positioned such that the center thereof with respect to the width direction is aligned with the camera hole 431. In other words, the second sound hole 520 may be formed symmetrically with respect to the camera hole 431. The camera hole 431 may be disposed to be aligned with the center of the housing 410. Thus the second sound hole 520 that is aligned with the camera hole 431 may also be formed to be aligned with the center of the housing 410. A foreign substance prevention member including a mesh may be disposed in the second sound hole 520 to prevent the inflow of external foreign substances through the second sound hole 520. The foreign substance prevention member may be disposed in an inlet portion of the second sound hole 520 or inside the second sound hole 520.

In an embodiment, multiple sound output modules 450 may be arranged in the housing 410 of the electronic device 400. For example, the sound output modules may be arranged at each of the upper end (e.g., the portion oriented in the +Y-axis direction based on FIG. 3) and the lower end (e.g., the portion oriented in the −Y-axis direction based on FIG. 3) of the housing 410. As described above, the sound output from the sound output module 450 positioned at the upper end of the housing 410 may be emitted through the first sound hole 510 and the second sound hole 520. The sound output from the sound output module 450 positioned at the lower end of the housing 410 may be emitted through a third sound hole (e.g., the sound hole 207 in FIG. 2A). In an embodiment, the third sound hole 207 may be formed through the lateral frame 411 constituting the side exterior of the electronic device 400. For example, referring to FIG. 2A, the third sound hole 207 may be formed through the lateral frame 411 to be positioned on the bottom side surface of the electronic device 400. Multiple holes constituting the third sound hole 207 may be formed through the lateral frame 411 in a direction parallel to the width direction (e.g., the X-axis direction based on FIG. 4) of the electronic device 400. In an embodiment, in consideration of the aesthetics of the electronic device 400, the third sound hole 207 may be positioned symmetrically with the second sound hole 520 with respect to a straight line in the width direction (e.g., the X-axis direction based on FIG. 4) of the electronic device 400. In this case, the center of the third sound hole 207 may be aligned with the camera hole 431, as the second sound hole 520. For example, the third sound hole 207 may be symmetric with respect to a straight line in the length direction (e.g., Y-axis direction based on FIG. 4) of the electronic device 400, which passes through the camera hole 431. In some embodiments, the center of the third sound hole 207 may be aligned with the center of the width direction (e.g., the X-axis direction based on FIG. 4) of the housing 410.

In an embodiment, referring to FIG. 6A, the second sound hole 520 may include a dummy hole 521 and a connection hole 522. In an embodiment, the dummy hole 521 among the second sound holes 520 may be positioned to be adjacent to the sound output module 450. The connection hole 522 may be positioned to be spaced farther apart from the sound output module 450 than the dummy hole 521. For example, the dummy hole 521 and the sound output module 450 may be positioned in the first direction (e.g., the −X-axis direction based on FIG. 6A) with respect to an imaginary first axis (e.g., the Y-axis based on FIG. 6A) passing between the connection hole 522 and the dummy hole 521. The connection hole 522 may be positioned in a second direction (e.g., the +X-axis direction based on FIG. 6A) which is a direction opposite to the first direction with reference to the first axis.

In an embodiment, referring to FIG. 6A, FIG. 6B and FIG. 6C, the connection hole 522 may have a hole or an opening shape which allows the sound output from the sound output module 450 to be emitted to the outside of the electronic device 400. On the other hand, the dummy hole 521 may be formed in a concave groove shape, and thus the inside and the outside of the electronic device 400 may not communicate with each other. In an embodiment, the dummy hole 521 may be formed in an opening shape other than a concave groove shape, and thus may be closed by a separate mechanical member (e.g., the shield member 610 in FIG. 8A). In this structure, the hole of the second sound hole 520 may include a hole formed to allow the inside and the outside of the electronic device 400 to communicate with each other, and a part of the hole may be shielded by the shield member 610. Therefore, the sound output from the sound output module 450 may be emitted to the outside of the electronic device 400 through the remaining holes except for the hole (e.g., the dummy hole 521) shielded through the shield member 610.

Figure 7:
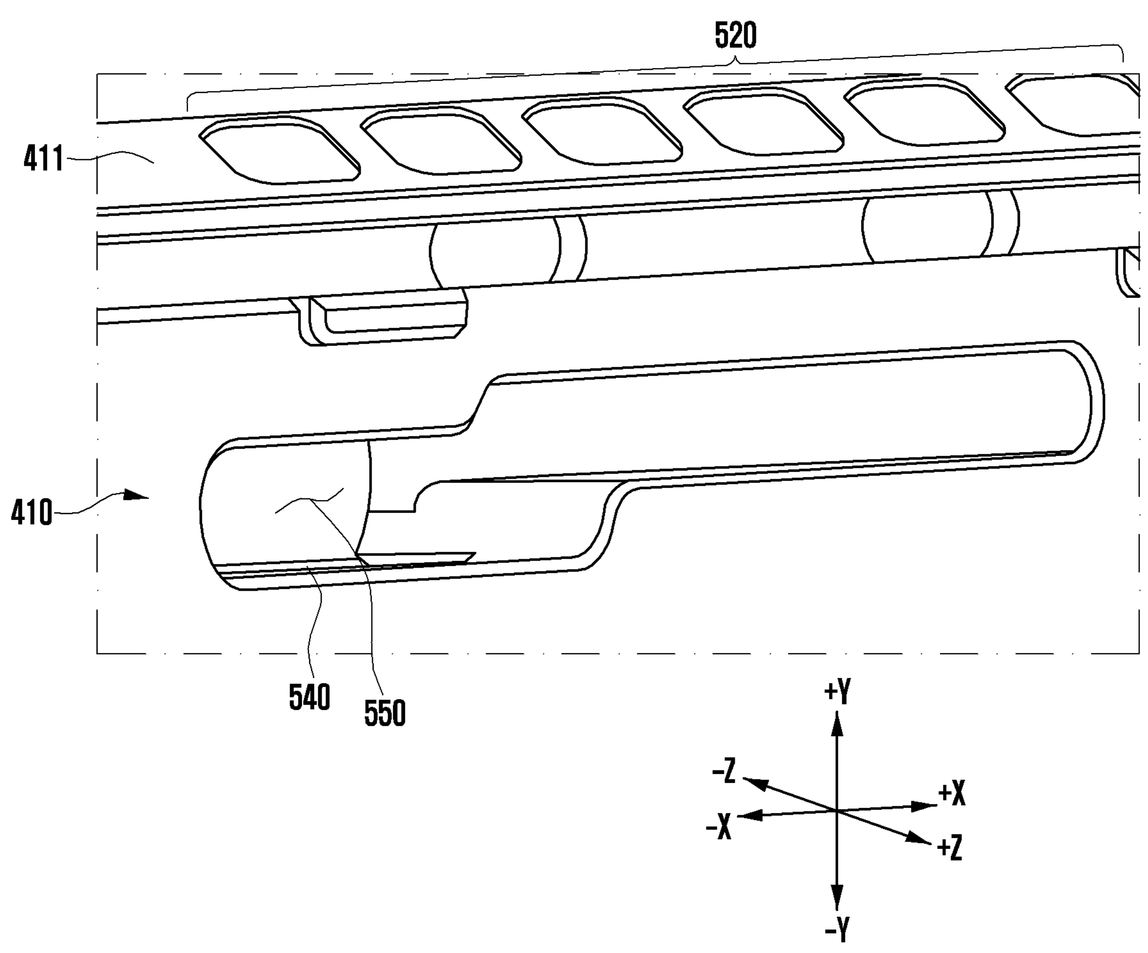
FIG. 7 is an enlarged view of a sound guide part seen from the front surface of an electronic device according to an embodiment of the disclosure.
Figure 8A:
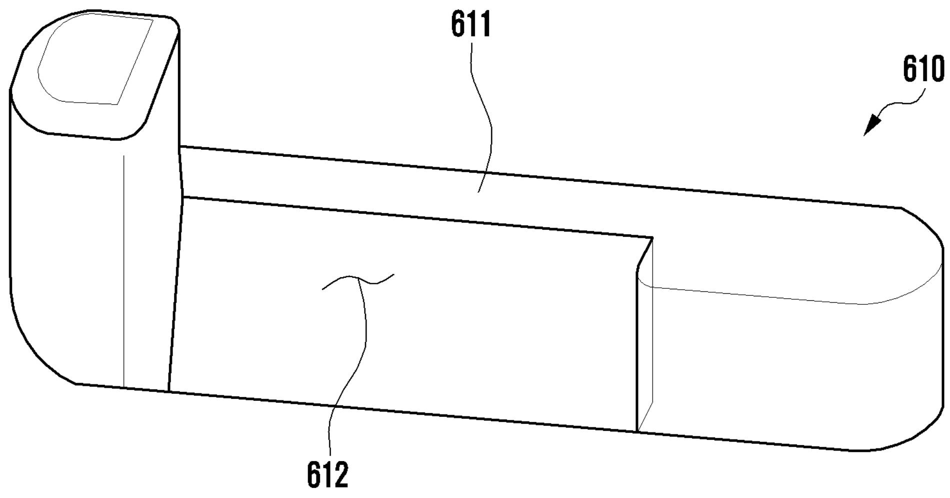
FIG. 8A is a perspective view of a shield member for shielding a part of a second sound hole according to an embodiment of the disclosure.
Figure 8B:
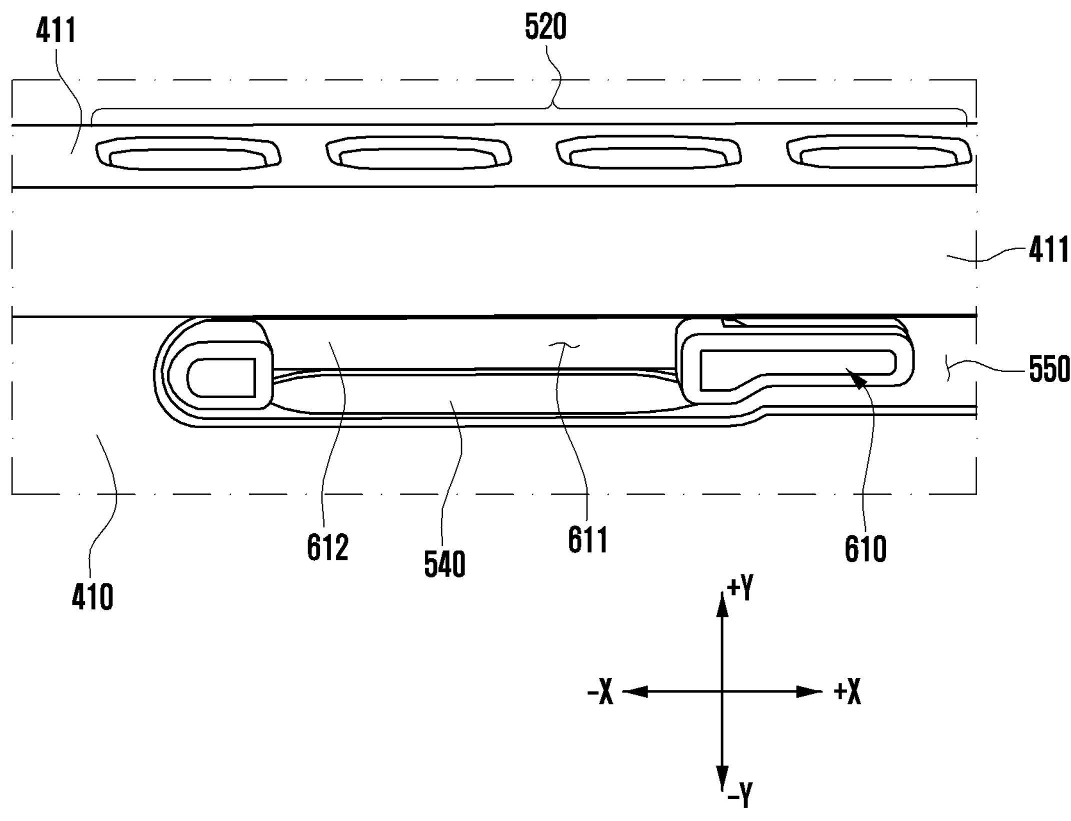
FIG. 8B is a view showing a state in which a shield member is disposed in a sound guide part according to an embodiment of the disclosure.

FIG. 7 is an enlarged view of a sound guide part seen from the front surface of an electronic device according to an embodiment of this disclosure. FIG. 8A is a perspective view of a shield member for shielding a part of a second sound hole according to an embodiment of this disclosure. FIG. 8B is a view showing a state in which a shield member is disposed in a sound guide part according to an embodiment of this disclosure.

According to various embodiments of this disclosure, the sound emitted from the speaker module 450 may be emitted to the outside of the electronic device 400 through a sound guide part which is formed or provided through the housing 410 or a housing assembly. Here, the "sound guide part (channel)" may mean a passage for guiding that sound (sound waves) is delivered. For example, the sound guide part may mean a physical space. The sound guide part may include a space filled with a medium (e.g., air) capable of delivering sound waves. Hereinafter, that sound is delivered through the sound guide part may mean that sound is delivered via a specific space.

According to an embodiment, as illustrated in FIG. 7, the electronic device 400 may include a sound outlet 540 through which sound generated from the sound output module 450 passes. In an embodiment, referring to FIG. 9A to be described later, the sound outlet 540 may be a passage extending obliquely with respect to the Y-axis in FIG. 9A. In an embodiment, the sound outlet 540 may be formed in one area of the housing 410, which is positioned adjacent to a portion from which sound is emitted, in the sound output module 450. Alternatively, the sound outlet 540 may be a space formed in a part of the support member 412 for supporting the sound output module 450.

In an embodiment, referring to FIG. 9A to be described later, the electronic device 400 may include a sealing member 630. The sealing member 630 may be disposed on a sound passage connected to the sound outlet 540 so as to prevent foreign substances outside the electronic device 400 from being introduced into the sound output module 450 through the sound outlet 540. The sealing member 630 may include an adhesive member which allows the sealing member to be fixed to another mechanical member, and may include a mesh structure capable of delivering sound but blocking foreign substances.

According to an embodiment, as illustrated in FIG. 7, the electronic device 400 may include the sound guide part 550 for connecting the first sound hole 510 and the second sound hole 520 and the sound output module 450. The receiver sound and the speaker sound output from the sound output module 450 may be transferred to the first sound hole 510 and/or the second sound hole 520 through the sound guide part 550. In an embodiment, the sound guide part 550 may extend from the sound outlet 540 so as to connect the first sound hole 510 and the second sound hole 520 to the sound outlet 540. In an embodiment, the sound guide part 550 may be formed in the housing 410 so that the sound output from the sound output module 450 is delivered to the first sound hole 510 and the second sound hole 520. In some embodiments, the sound guide part 550 may be formed by multiple mechanical members constituting the housing 410. For example, the sound guide part 550 may be formed through the support member 412 and a lateral frame 411 constituting the side exterior of the housing 410.

In an embodiment, as described above, the second sound hole 520 may include the connection hole 522 through which the sound output from the sound output module 450 is substantially emitted to the outside of the electronic device 400. The sound guide part 550 may connect the connection hole 522 of the second sound hole 520 and the sound output module 450. In addition, the sound guide part 550 may connect the first sound hole 510 and the sound output module 450. Therefore, according to an application operation, in case that the speaker sound is generated in the sound output module 450, the speaker sound may be emitted through the first sound hole 510 and the second sound hole 520.

According to an embodiment, the first sound hole 510 and the second sound hole 520 may be connected to the sound output module 450 through the sound guide part 550. In this structure, in case that the receiver sound is generated in the sound output module 450, the receiver sound may be emitted to the outside of the electronic device 400 not only through the first sound hole 510 but also through the second sound hole 520. In this case, the call sound by a user may be exposed to other persons, and thus the privacy of the user may be violated. According to an embodiment of this disclosure, holes constituting the second sound hole 520, which are adjacent to the sound output module 450, may be shielded. For example, holes constituting the second sound hole 520, which are adjacent to the sound output module 450, may be used as the dummy hole 521, and the remaining holes thereof except for the dummy hole 521, which are relatively spaced apart from the sound output module 450, may be used as the connection hole 522. As described above, the second sound hole 520 may include the dummy hole 521 positioned in the first direction (e.g., the −X-axis direction based on FIG. 6A) with reference to the camera module 440, and the connection hole 522 positioned in the second direction (e.g., the +X-axis direction based on FIG. 6A) with reference to the camera module 440. The dummy hole 521 may be a shielded hole, and may be a hole for blocking the inside and the outside of the electronic device 400. The connection hole 522 may be a hole which connects the inside and the outside of the electronic device 400 and through which the sound output from the sound output module 450 is emitted, among the second sound holes 520.

According to an embodiment, the dummy hole 521 may have a form in which the inside thereof is blocked. For example, the dummy hole 521 may be formed in a concave groove shape, and thus the inside and the outside of the electronic device 400 may not communicate with each other.

According to an embodiment, the dummy hole 521 may be formed in an opening shape other than a concave groove shape, and thus may be closed by a separate mechanical member (e.g., the shield member 610 in FIG. 8A). In this structure, the hole of the second sound hole 520 may include a hole formed to allow the inside and the outside of the electronic device 400 to communicate with each other, and a part of the hole may be shielded through the shield member 610. In an embodiment, referring to FIG. 8A and FIG. 8B, the shield member 610 may be disposed in the sound guide part 550 to shield the dummy hole 521. The shield member 610 may be positioned in the sound guide part 550 to be disposed adjacent to the sound outlet 540 through which the sound output from the sound output module 450 is output. Referring to FIG. 8A, the shield member 610 may include a shield part 611 for closing the dummy hole 521, and an opening 612. The shield member 610 may be disposed in the sound guide part 550 so that the shield part 611 faces the dummy hole 521. In an embodiment, the opening 612 may connect the sound outlet 540 and the sound guide part 550. For example, the receiver sound or the speaker sound generated in the sound output module 450 may pass sequentially via the sound outlet 540—the opening 612 of the shield member 610—the sound guide part 550, and then may be emitted to the first sound hole 510 and/or the second sound hole 520.

According to an embodiment of the disclosure, the dummy hole 521 of the second sound hole 520 may be variously formed. For example, in an embodiment, the dummy hole 521 may be formed in a concave groove shape, and thus the inside and the outside of the electronic device 400 may not communicate with each other. In some embodiments, the dummy hole 521 may be formed in an opening shape other than a concave groove shape, and thus may be closed by a separate mechanical member (e.g., the shield member 610 in FIG. 8A). In this case, the receiver sound output from the sound output module 450 may be emitted to the outside of the electronic device 400 through the first sound hole 510. For example, the first sound hole 510 may be positioned to be more adjacent to the sound output module 450 than the second sound hole 520. The receiver sound may be sound heard by a user in a state where the first sound hole 510 is approached to the ear by the user gripping the electronic device 400, and thus may have a relatively lower sound intensity (decibel (db)) than the speaker sound. In this case, the receiver sound may be emitted through the first sound hole 510 before reaching the connection hole 522 of the second sound hole 520, which is relatively further spaced apart from the sound output module 450 than the first sound hole 510. For example, the receiver sound generated in the sound output module 450 may be emitted to the outside of the electronic device 400 through the first sound hole 510 after via the sound outlet 540—sound guide part 550. Accordingly, as the receiver sound emitted through the second sound hole 520 is reduced, the problem of user privacy may be improved.

In comparison therewith, the speaker sound may be used in case that a speaker mode is activated in video, game, and call operation modes, and may require a relatively higher sound intensity than the receiver sound. In this case, since the intensity of the speaker sound is higher than that of the receiver sound, the speaker sound may be emitted to the outside of the electronic device 400 through the first sound hole 510 and the second sound hole 520. Therefore, the speaker sound generated in the sound output module 450 may be emitted to the outside of the electronic device 400 through first sound hole 510 and the second sound hole 520 after via the sound outlet 540—the sound guide part 550. Meanwhile, in case that the shield member 610 is disposed in the sound guide part 550, a sound movement passage may be narrowed so that the acoustic performance thereof is reduced. According to an embodiment of this disclosure, the speaker sound generated in the sound output module 450 may be emitted to the outside of the electronic device 400 through the first sound hole 510 and the second sound hole 520, and thus the speaker performance thereof can be improved.

According to an embodiment, the shield member 610 may be formed of various materials. For example, the shield member may be formed of an elastic material, a metallic material, or a non-metallic material. The elastic material may include a material such as rubber or urethane. The metal material may include an alloy such as aluminum, stainless steel (STS or SUS), iron, magnesium, and titanium, and the non-metal material may include synthetic resin, ceramics, and engineering plastic. In addition, the shield member 610 may be formed by various methods such as injection molding or die casting.

Although not illustrated in the drawings, in an embodiment, the shield member 610 may be a portion of a mechanical member constituting the housing 410 of the electronic device 400. For example, the shield member 610 may be a portion of a rear case (e.g., the second support member 360 in FIG. 3) disposed toward the rear surface of the housing 410. A portion of the rear case, which is disposed on the rear surface of the housing 410, may extend to the dummy hole 521 so as to close the dummy hole 521. In some embodiments, the shield member 610 may be a concept referring to a portion of the housing 410, which closes the dummy hole 521. In addition, the dummy hole 521 formed through the lateral member 411 of the housing 410 may be closed by a separate mechanical member (e.g., the shield member 610) disposed inside the housing 410 or may be closed by various methods within the range which can be carried out by a person skilled in the art, such as a method of closing the dummy hole 521 by extending a mechanical member constituting the housing 410.

Figure 9A:
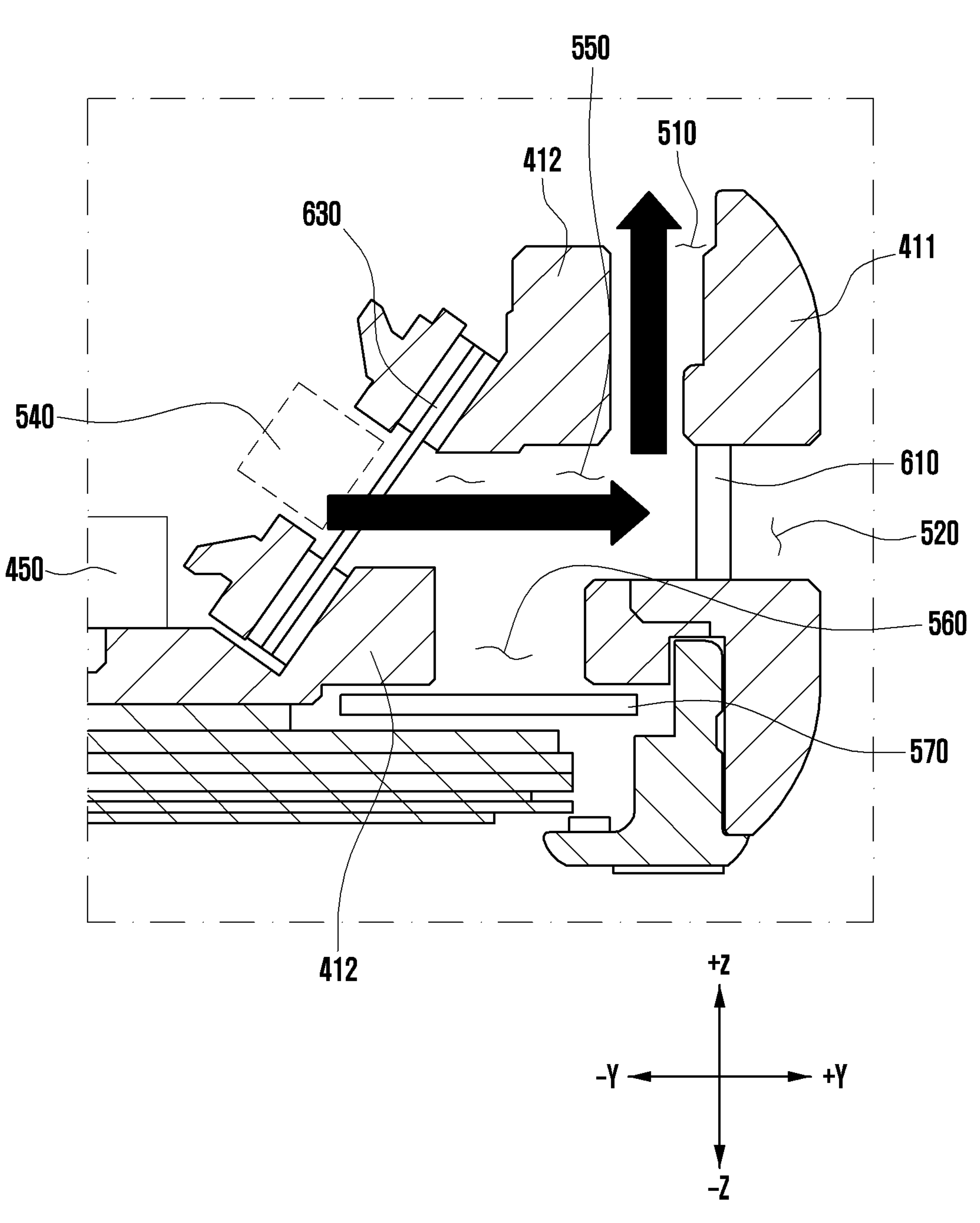
FIG. 9A is a cross-sectional view of the electronic device taken along line A-A in FIG. 6A.
Figure 9B:
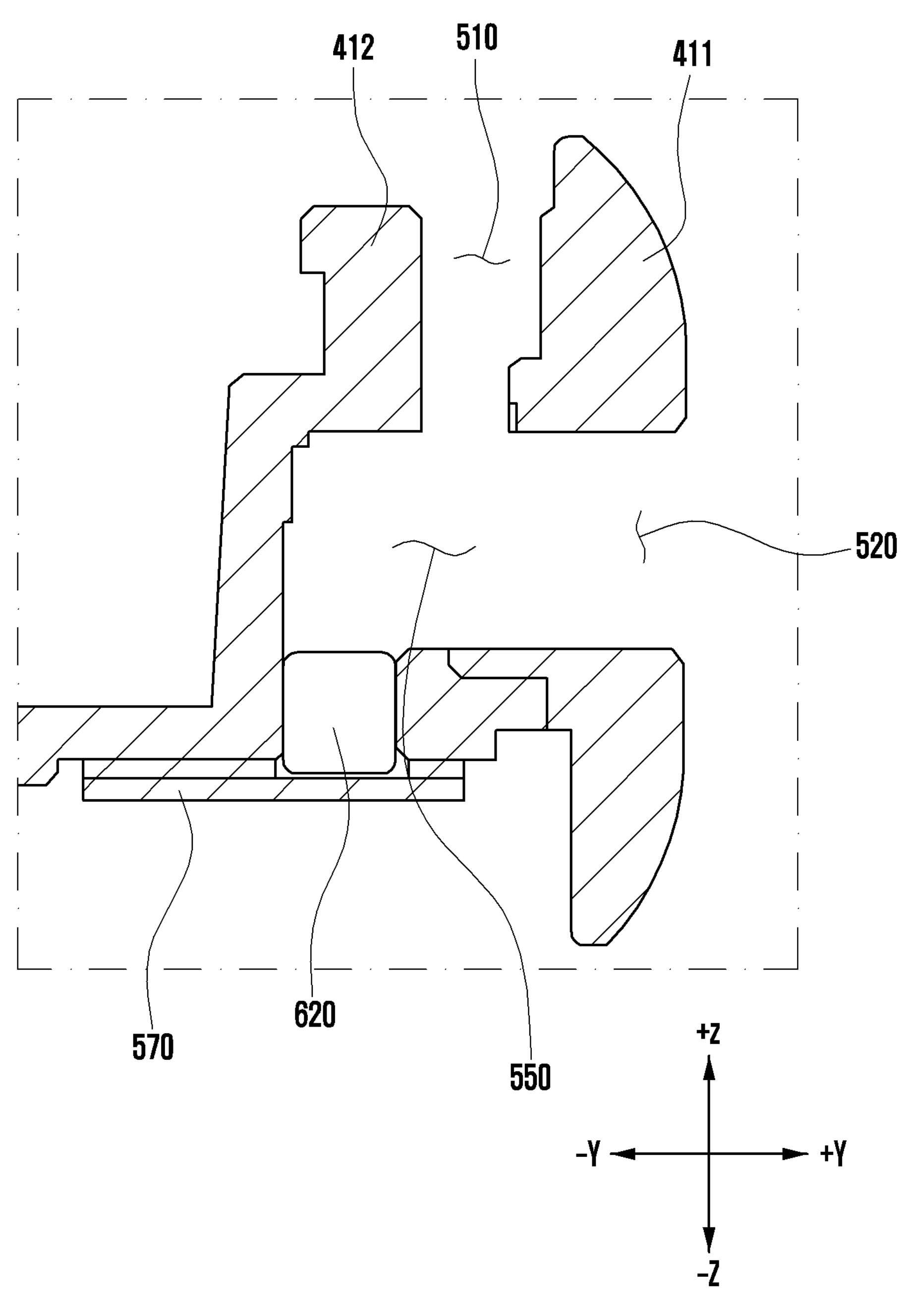
FIG. 9B is a cross-sectional view of the electronic device taken along line B-B in FIG. 6A.

FIG. 9A is a cross-sectional view of the electronic device taken along line A-A in FIG. 6A. FIG. 9B is a cross-sectional view of the electronic device taken along line B-B in FIG. 6A.

According to an embodiment, as illustrated in FIG. 9A and FIG. 9B, a penetration part 560, which is formed from the rear surface (e.g., the surface oriented in the −Z-axis direction based on FIG. 9A) of the housing 410 toward the front surface (e.g., the surface oriented in the +Z-axis direction based on FIG. 9A) of the housing 410, may be included therein. In an embodiment, the penetration part 560 may be a part of the sound guide part 550. The penetration part 560 may be formed by a machining tool. The machining tool may also be used to form the sound guide part 550 in the housing 410. The sound guide part 550 may be formed by machining the housing 410 in the width direction (e.g., the X-axis direction based on FIG. 8B) of the electronic device 400 by a machining tool inserted through the penetration part 560.

According to an embodiment, as illustrated in FIG. 9A and FIG. 9B, a soundproof member 570 for covering the penetration part 560 may be disposed on the rear surface of the housing 410. The soundproof member 570 may block sound, which is output from the sound output module 450, from being emitted to the outside of the electronic device 400 through the penetration part 560. In an embodiment, the soundproof member 570 may be formed of a metal material such as stainless use steel (SUS) or aluminum (AL), or a non-metal material such as rubber, urethane, or silicone, and may shield the penetration part 560.

According to an embodiment, the size of multiple holes constituting the first sound hole 510 and the second sound hole 520 may be adjusted to adjust the bandwidth of the sound emitted through the first sound hole 510 and the second sound hole 520. In an embodiment, the first sound hole 510 may be a hole formed through the front surface of the electronic device 400, and the size thereof may be limited in consideration of an aesthetic factor. For example, as the widths (e.g., the lengths in the Y-axis direction length based on FIG. 6B) of multiple holes constituting the first sound hole 510 increase, the degree, in which the holes are visually recognized by a user on the front surface of the electronic device 400, may increase so that aesthetics is reduced. According to an embodiment of the disclosure, in consideration of an aesthetic factor, the widths (e.g., the lengths in the X-axis direction based on FIG. 6B) of the holes constituting the first sound hole 510 may be adjusted. For example, the widths of the holes constituting the first sound hole 510 may be substantially the same as the widths of the holes constituting the second sound hole 520. In some embodiments, the widths of the holes constituting the first sound hole 510 may be wider than the widths of the holes constituting the second sound hole 520, and conversely, may be narrower. Therefore, by adjusting the widths of the holes constituting each of the first sound hole 510 and the second sound hole 520, it may be possible to emit sound having a desired sound band.

According to an embodiment, in case that the sizes of the holes constituting the first sound hole 510 or the second sound hole 520 are changed, distortion may occur in a resonant frequency emitted through the sound holes 510 and 520. For example, in case that the widths of the holes constituting the first sound hole 510 are increased, the volume of a sound passage including the sound holes 510 and 520 and the sound guide part 550 may increase so that the resonance frequency thereof reduces. That is, distortion may occur in the resonant frequency of the sound generated in the sound output module 450. Accordingly, sound having a desired bandwidth may not be output through the sound holes 510 and 520. In an embodiment, a dummy member 620 may be disposed in the sound guide part 550. The dummy member 620 may be a member which is formed of a material such as rubber or urethane and has a predetermined volume. The dummy member 620 may be disposed in a part of the penetration part 560. As the dummy member 620 is disposed, the volume of the sound passage including the sound holes 510 and 520 and the sound guide part 550 may be reduced. Accordingly, the width of the first sound hole 510 may be expanded, and thus the increase in the volume of the sound passage may be at least partially offset. Accordingly, distortion of the resonance frequency of the sound generated in the sound output module 450 may be prevented. Therefore, the sound output from the sound output module 450 may be emitted through the first sound hole 510 and the second sound hole 520 while having a set bandwidth.

In the above description, it has been explained that distortion of sound generated in the sound output module 450 may occur in case that the widths of the holes of the first sound hole 510 are expanded. However, even in case that the widths of the holes constituting the second sound hole 520 are expanded, distortion of sound may occur. In this case, the expansion of the volume of the second sound hole 520 may be offset through the dummy member 620 disposed in the sound guide part 550.

Figure 10A:
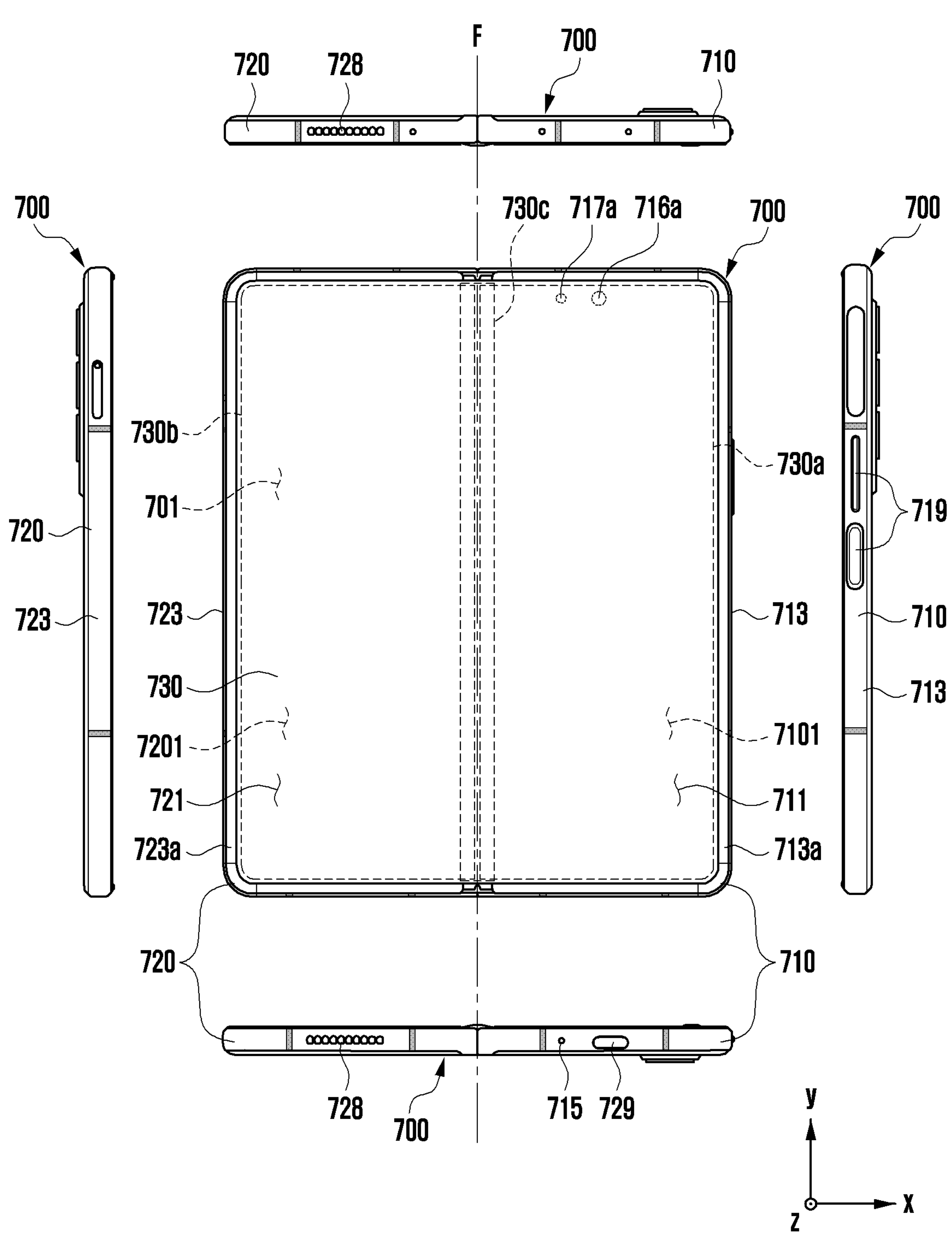
FIG. 10A and FIG. 10B are views when an electronic device in an unfolded state according to an embodiment of the disclosure is seen from the front surface and the rear surface thereof
Figure 10B:
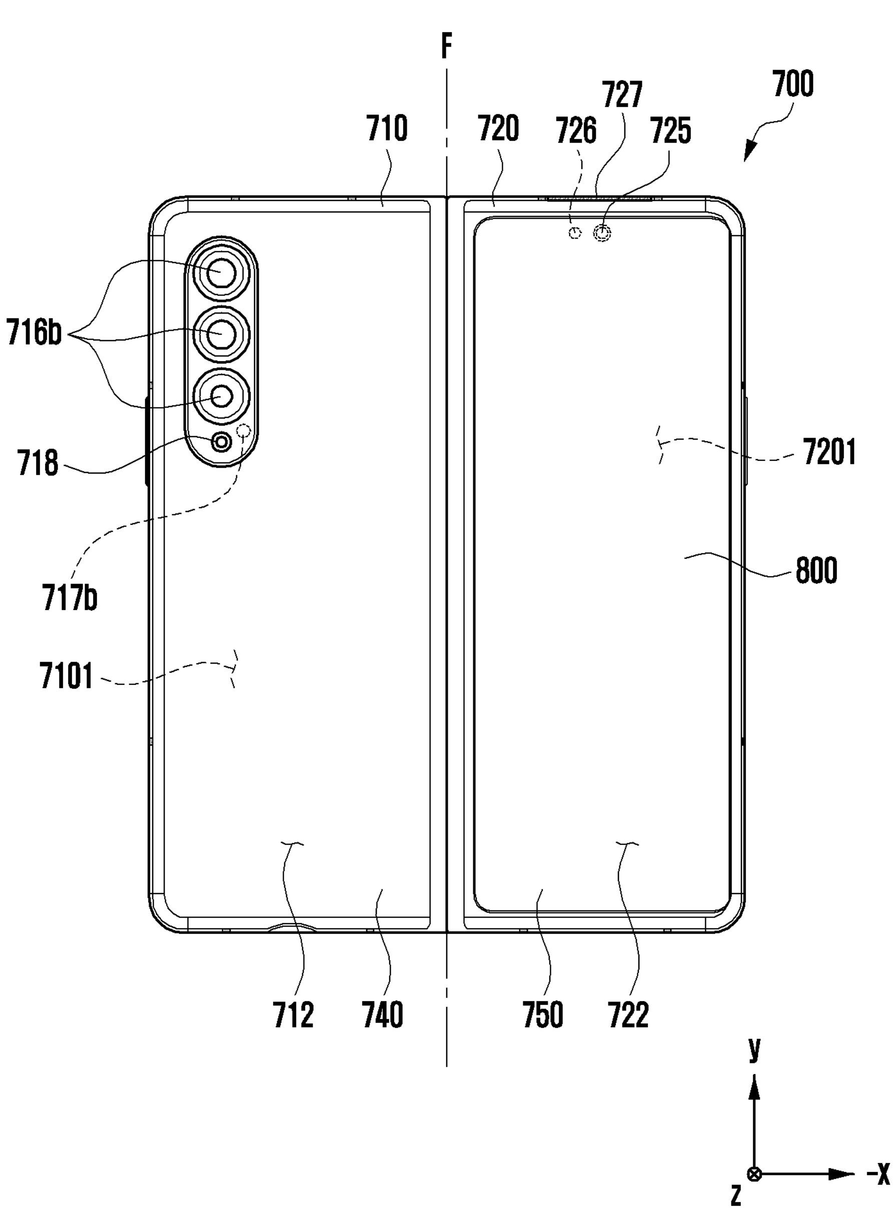
Figure 11A:
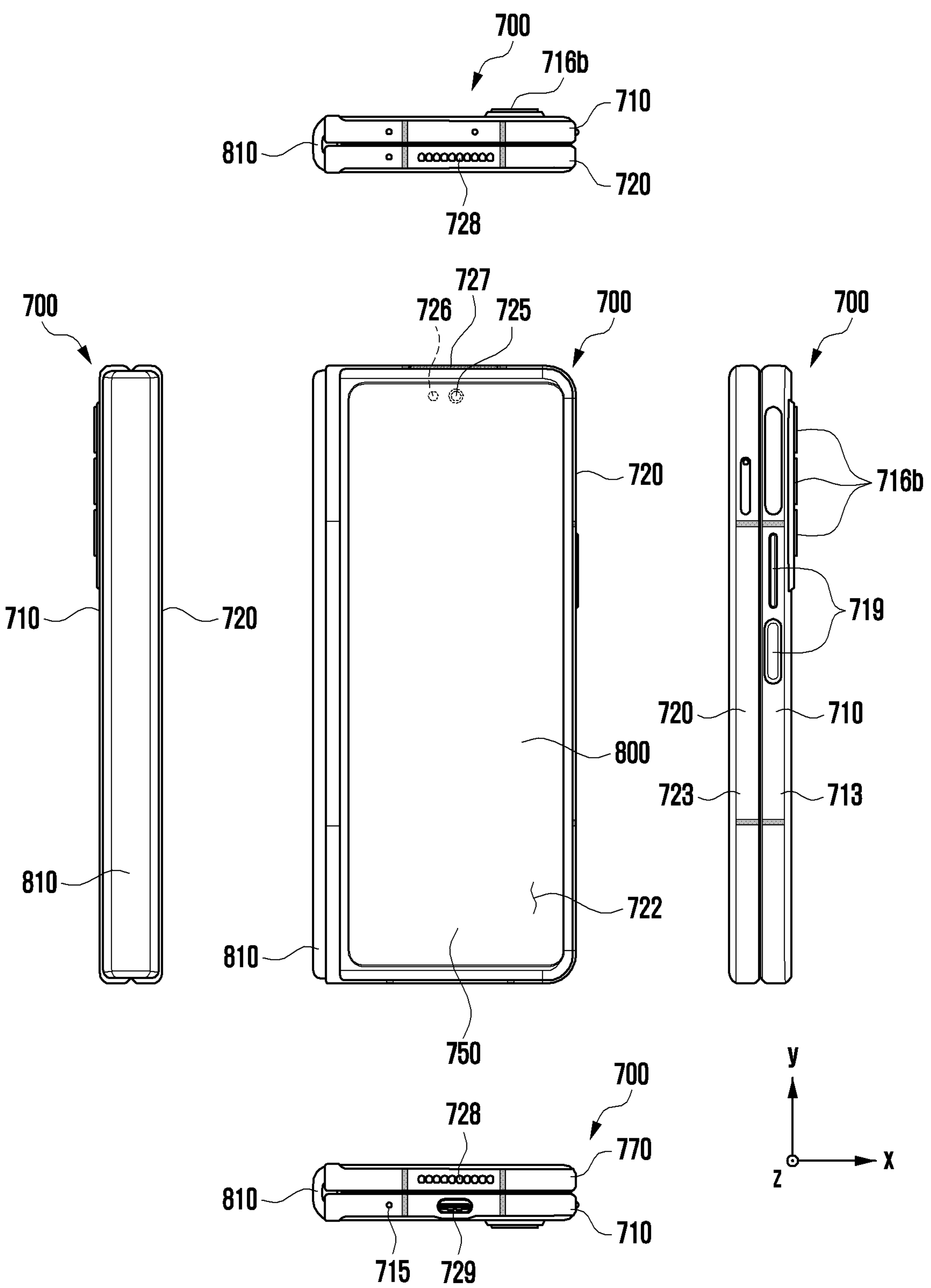
FIG. 11A and FIG. 11B are views when an electronic device in a folded state according to an embodiment of the disclosure is seen from the front surface and the rear surface thereof
Figure 11B:
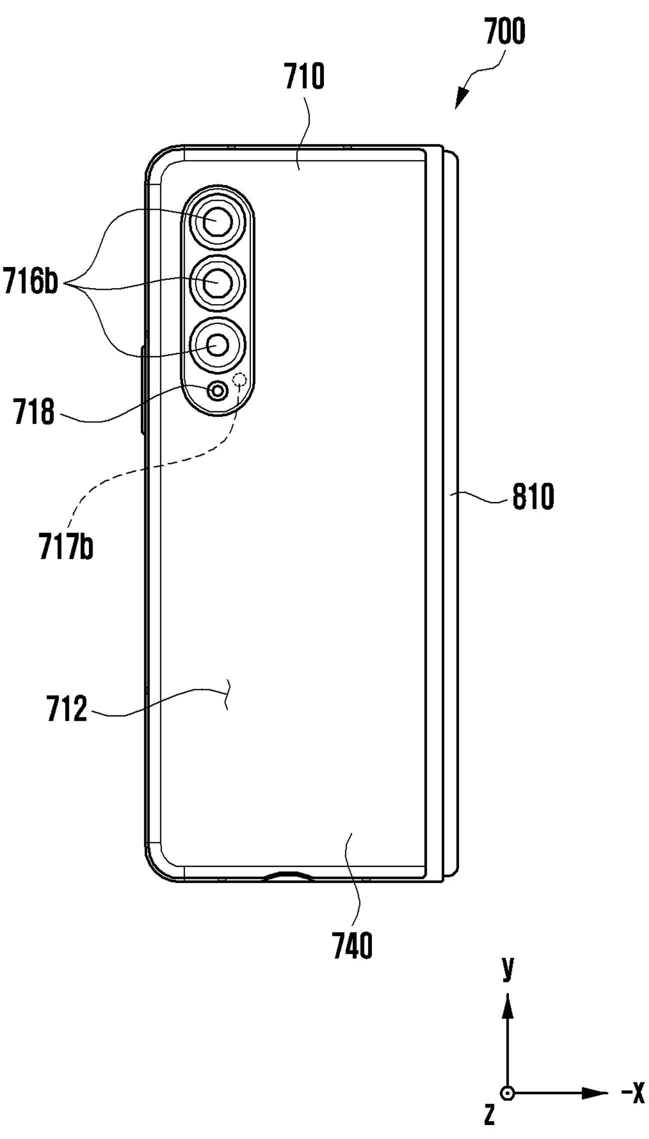

FIG. 10A and FIG. 10B are views when an electronic device in an unfolded state according to an embodiment of the disclosure is seen from the front surface and the rear surface thereof. FIG. 11A and FIG. 11B are views when an electronic device in a folded state according to an embodiment of the disclosure is seen from the front surface and the rear surface thereof The description to be described below may be a description of an electronic device according to an embodiment different from the electronic device 400 illustrated in FIG. 2A to FIG. 5B. For example, an electronic device 700 illustrated in FIG. 10A to FIG. 12 may be a foldable electronic device in which a first housing 710 and a second housing 720 can be folder together and unfolder. Hereinafter, in connection with elements which are the same as or similar to the elements described in the previous drawing, same or similar reference numerals may be used to refer to the same members, except when otherwise indicated.

Referring to FIGS. 10A to 11B, an electronic device 700 may include a pair of housings 710 and 720 (e.g., a foldable housing structure) rotatably coupled to each other with reference to folding axis F through at least one hinge device (e.g., a hinge device 900-1, 900-2 of FIG. 3) (e.g., a hinge module) so as to be folded with respect to each other, a first display 730 (e.g., a flexible display, a foldable display, or a main display) disposed through the pair of housings 710 and 720, and/or a second display 800 (e.g., a sub display) disposed through the second housing 720. According to an embodiment, at least a part of the hinge device (e.g., the hinge device 900-1, 900-2 of FIG. 12) may be disposed so as not to be seen from the outside through the first housing 710 and the second housing 720, and may be disposed so as not to be seen from the outside through the hinge housing 810 covering a foldable portion. In the disclosure, a surface in which the first display 730 is disposed may be defined as a front surface of the electronic device 700, and a surface opposite to the front surface may be defined as a rear surface of the electronic device 700. In addition, a surface surrounding a space between the front surface and the rear surface may be defined as a side surface of the electronic device 700.

Figure 12:
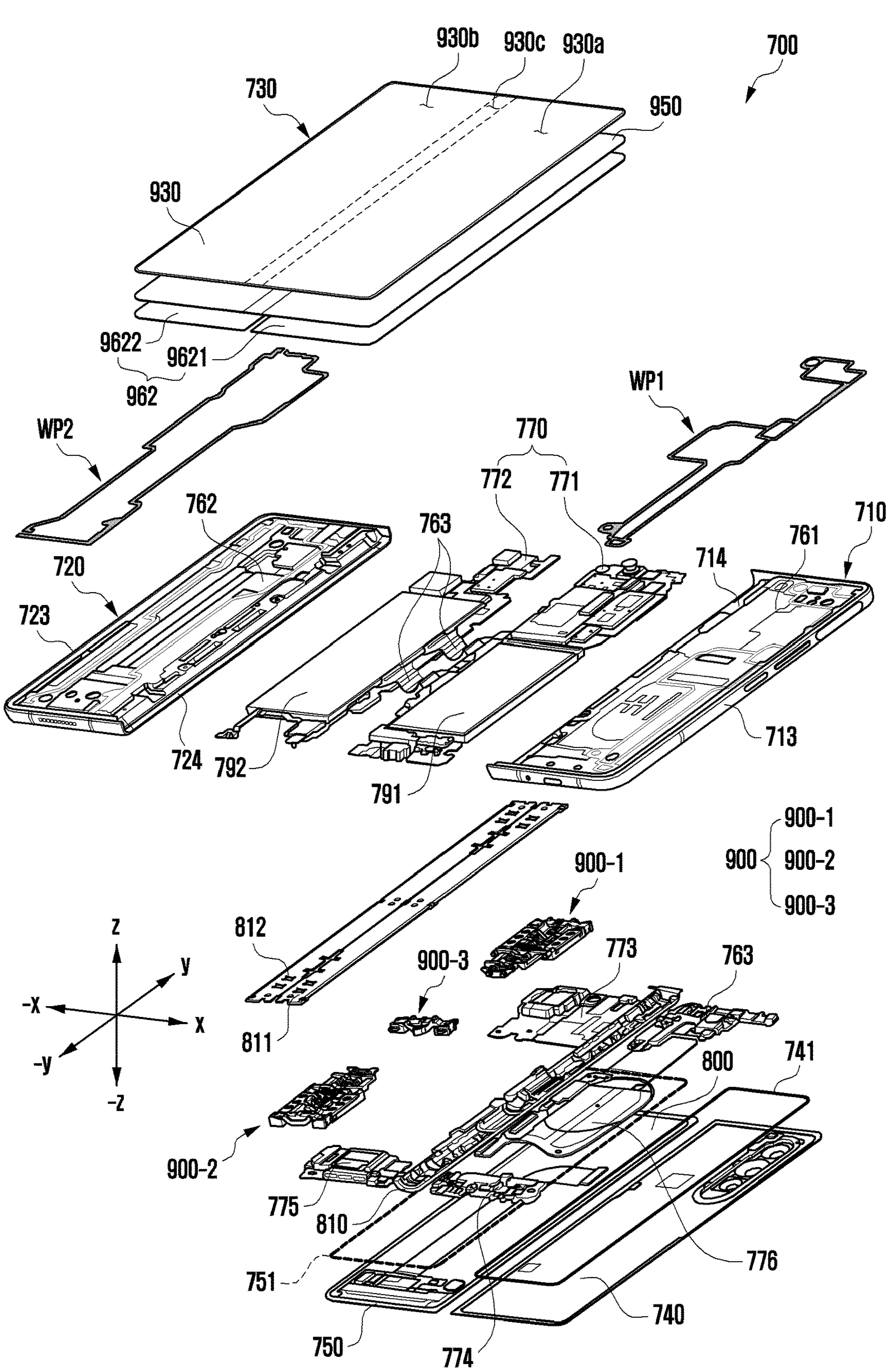
FIG. 12 is an exploded perspective view of an electronic device according to an embodiment of the disclosure.

According to various embodiments, the pair of housings 710 and 720 may include a first housing 710 and a second housing 720 foldably arranged with respect to each other through the hinge device (e.g., the hinge device 900-1, 900-2 of FIG. 12). According to an embodiment, the shape and the coupling of the pair of housings 710 and 720 are not limited to those illustrated in FIGS. 10A to 11B, and the pair of housings 710 and 720 may be implemented by a combination and/or coupling of other shapes or components. The first housing 710 and the second housing 720 may be arranged on opposite sides with reference to the folding axis F, and may have shapes that are entirely symmetric to each other with respect to the folding axis F. According to an embodiment, the first housing 710 and the second housing 720 may be asymmetrically folded with reference to the folding axis F. The angle or the distance between the first housing 710 and the second housing 720 may vary depending on whether the electronic device 700 is in an unfolded state, a folded state, or an intermediate state.

According to various embodiments, the first housing 710 may include, in the unfolded state of the electronic device 700, a first surface 211 connected to the hinge device (e.g., the hinge device 900-1, 900-2 of FIG. 12) and disposed to be oriented to the front surface of the electronic device 700, a second surface 712 oriented in a direction opposite to the first surface 211, and/or a first side member 713 surrounding at least a part of a first space 7101 between the first surface 211 and the second surface 712. According to an embodiment, the second housing 720 may include, in the unfolded state of the electronic device 700, a third surface 721 connected to the hinge device (e.g., the hinge device 900-1, 900-2 of FIG. 12) and disposed to be oriented to the front surface of the electronic device 700, a fourth surface 722 oriented in a direction opposite to the third surface 721, and/or a second side member 723 surrounding at least a part of a second space 7201 between the third surface 721 and the fourth surface 722. According to an embodiment, the first surface 211 and the third surface 721 may be oriented in substantially the same direction in the unfolded state, and the first surface 211 and the third surface 721 may at least partially face each other in the folded state. The electronic device 700 may include a recess 701 formed to receive the first display 730 through structural coupling of the first housing 710 and the second housing 720. According to an embodiment, the recess 701 may have substantially the same shape as the first display 730.

According to various embodiments, the hinge housing 810 (e.g., a hinge cover) may be disposed between the first housing 710 and the second housing 720, and may be disposed to cover a part (e.g., at least one hinge module) of the hinge device (e.g., the hinge device 900-1, 900-2 of FIG. 12) disposed on the hinge housing 810. According to an embodiment, the hinge housing 810 may be hidden or exposed from or to the outside by a part of the first housing 710 and the second housing 720 according to the unfolded state, the folded state, or the intermediate state of the electronic device 700. For example, when the electronic device 700 is in the unfolded state, at least a part of the hinge housing 810 may be covered by the first housing 710 and the second housing 720 and not be substantially exposed. According to an embodiment, when the electronic device 700 is in the folded state, at least a part of the hinge housing 810 may be exposed to the outside between the first housing 710 and the second housing 720. According to an embodiment, in the intermediate state in which the first housing 710 and the second housing 720 are folded with each other by a predetermined angle (folded with a certain angle), the hinge housing 810 may be at least partially exposed to the outside of the electronic device 700 between the first housing 710 and the second housing 720. For example, an area in which the hinge housing 810 is exposed to the outside, may be smaller than that in a case in which the electronic device 700 is completely folded. According to an embodiment, the hinge housing 810 may include a curved surface.

According to various embodiments, when the electronic device 700 is in the unfolded state (e.g., the states shown in FIGS. 10A and 10B), the first housing 710 and the second housing 720 may be disposed at an about 180-degree angle, and a first area 730*a*, a second area 730*b*, and a folding area 730*c* of the first display 730 may form the same plane and arranged to be oriented in substantially the same direction (e.g., a z-axis direction). In another embodiment, when the electronic device 700 is in the unfolded state, the first housing 710 may rotate by an about 360-degree angle with respect to the second housing 720, and may be outwardly folded (an out-folding scheme) so that the second surface 712 and the fourth surface 722 face each other.

According to various embodiments, when the electronic device 700 is in the folded state (e.g., the states shown in FIGS. 11A and 11B), the first surface 211 of the first housing 710 and the third surface 721 of the second housing 720 may be arranged to face each other. In this case, the first area 730*a* and the second area 730*b* of the first display 730 may be disposed so as to form a narrow angle (e.g., a range between 0 degree to about 10 degrees) through the folding area 730*c*, and may be arranged to face each other. According to an embodiment, at least a part of the folding area 730*c* may be deformed into a curved shape having a predetermined curvature. According to an embodiment, when the electronic device 700 is in the intermediate state, the first housing 710 and the second housing 720 may be arranged to form a predetermined angle (a certain angle). In this case, the first area 730*a* and the second area 730*b* of the first display 730 may be arranged to form an angle that is greater than that in the folded state and smaller than that in the unfolded state, and the curvature of the folding area 730*c* may be lower than that in the folded state, and may be higher than that in the unfolded state. In an embodiment, the first housing 710 and the second housing 720 may be arranged to form an angle which allows stopping at a designated folding angle between the folded state and the unfolded state (a free stop function), through the hinge device (e.g., the hinge device 900-1, 900-2 of FIG. 12). In an embodiment, the first housing 710 and the second housing 720 may continuously operate while being pressed in an unfolding direction or a folding direction with reference to a designated inflection angle, through the hinge device (e.g., the hinge device 900-1, 900-2 of FIG. 12).

According to various embodiments, the electronic device 700 may include at least one of at least one display 730 and 800 disposed on the first housing 710 and/or the second housing 720, an input device 715, sound output devices 727 and 728, sensor modules 717*a*, 717*b*, and 726, camera modules 716*a*, 716*b*, and 725, a key input device 719, an indicator (not shown), or a connector port 729. In an embodiment, the electronic device 700 may omit at least one of the elements, or may additionally include at least one another element.

According to various embodiments, the at least one display 730 and 800 may include a first display 730 (e.g., a flexible display) disposed to be supported by the third surface 721 of the second housing 720 from the first surface 211 of the first housing 710 through the hinge device (e.g., the hinge device 900-1, 900-2 of FIG. 12), and a second display 800 disposed to be at least partially seen from the outside through the fourth surface 722 in a space in the second housing 720. In an embodiment, the second display 800 may be disposed to be seen from the outside through the second surface 712 in a space in the first housing 710. According to an embodiment, the first display 730 may be mainly used in the unfolded state of the electronic device 700, and the second display 800 may be mainly used in the folded state of the electronic device 700. According to an embodiment, the electronic device 700 may control, in the intermediate state, the first display 730 and/or the second display 800 to be used, based on a folding angle between the first housing 710 and the second housing 720.

According to various embodiments, the first display 730 may be disposed in a receiving space formed by the pair of housings 710 and 720. For example, the first display 700 may be disposed in a recess 701 formed by the pair of housings 710 and 720, and may be disposed to occupy substantially the most of the front surface of the electronic device 700 in the unfolded state. According to an embodiment, the first display 730 may include a flexible display having at least one area which can be deformed into a plane or a curved surface.

According to an embodiment, the first display 730 may include the first area 730*a* facing the first housing 710 and the second area 730*b* facing the second housing 720. According to an embodiment, the first display 730 may include the folding area 730*c* including a part of the first area 730*a* and a part of the second area 730*b* with respect to the folding axis F. According to an embodiment, at least a part of the folding area 730*c* may include an area corresponding to the hinge device (e.g., the hinge device 900-1, 900-2 of FIG. 12). According to an embodiment, a division of an area of the first display 730 merely corresponds to exemplary physical division by the pair of housings 710 and 720 and the hinge device (e.g., the hinge device 900-1, 900-2 of FIG. 12), and the first display 730 may be substantially displayed as one seamless full screen through the pair of the housings 710 and 720 and the hinge device (e.g., the hinge device 900-1, 900-2 of FIG. 12). According to an embodiment, the first area 730*a* and the second area 730*b* may have shapes that are entirely symmetric or partially asymmetric to each other with respect to the folding area 730*c*.

According to various embodiments, the electronic device 700 may include a first rear cover 740 disposed on the second surface 712 of the first housing 710 and a second rear cover 750 disposed on the fourth surface 722 of the second housing 720. In an embodiment, at least a part of the first rear cover 740 may be integrally formed with the first side member 713. In an embodiment, at least a part of the second rear cover 750 may be integrally formed with the second side member 723. According to an embodiment, at least one of the first rear cover 740 and the second rear cover 750 may be substantially formed of a transparent plate (e.g., a polymer plate or glass plate including various coding layers) or an opaque plate. According to an embodiment, the first rear cover 740 may be formed of, for example, an opaque plate such as coded or colored glass, ceramic, polymer, metal (e.g., aluminum, stainless steel (STS), or magnesium), or a combination of at least two of the materials above. According to an embodiment, the second rear cover 750 may be substantially formed of, for example, a transparent plate such as glass or polymer. Accordingly, the second display 800 may be disposed to be seen from the outside through the second rear cover 750 in a space in the second housing 720.

According to various embodiments, the input device 715 may include a microphone. In an embodiment, the input device 715 may include multiple microphones arranged to detect the direction of sound. According to an embodiment, the sound output devices 727 and 728 may include speakers. According to an embodiment, the sound output devices 727 and 728 may include a call receiver 727 disposed through the fourth surface 722 of the second housing 720 and an external speaker 728 disposed through at least a part of the second side member 723 of the second housing 720. In an embodiment, the input device 715, the sound output devices 727 and 728, and the connector 729 may be disposed in spaces of the first housing 710 and/or the second housing 720, and may be exposed to an external environment through at least one hole formed through the first housing 710 and/or the second housing 720. In an embodiment, holes formed through the first housing 710 and/or the second housing 720 may be commonly used for the input device 715 and the sound output devices 727 and 728. In an embodiment, the sound output devices 727 and 728 may include a speaker (e.g., a piezo speaker) operating without including a hole formed through the first housing 710 and/or the second housing 720.

According to various embodiments, the camera modules 716*a*, 716*b*, and 725 may include a first camera module 716*a* disposed on the first surface 211 of the first housing 710, a second camera module 716*b* disposed on the second surface 712 of the first housing 710, and/or a third camera module 725 disposed on the fourth surface 722 of the second housing 720. According to an embodiment, the electronic device 700 may include a flash 718 disposed around the second camera module 716*b*. According to an embodiment, the flash 718 may include, for example, either a light-emitting diode or a xenon lamp. According to an embodiment, the camera modules 716*a*, 716*b*, and 725 may include one or multiple lenses, an image sensor, and/or an image signal processor. In an embodiment, at least one of the camera modules 716*a*, 716*b*, and 725 may include two or more lenses (e.g., wide-angle and telephoto lenses) and image sensors, and may be arranged together on one surface of the first housing 710 and/or the second housing 720.

According to various embodiments, the sensor modules 717*a*, 717*b*, and 726 may generate a data value or an electrical signal corresponding to an internal operational state or an external environmental state of the electronic device 700. According to an embodiment, the sensor modules 717*a*, 717*b*, and 726 may include a first sensor module 717*a* disposed on the first surface 211 of the first housing 710, a second sensor module 717*b* disposed on the second surface 712 of the first housing 710, and/or a third sensor module 726 disposed on the fourth surface 722 of the second housing 720. In an embodiment, the sensor modules 717*a*, 717*b*, and 726 may include at least one of a gesture sensor, a grip sensor, a color sensor, an infrared (IR) sensor, an illuminance sensor, an ultrasonic sensor, an iris recognition sensor, or a distance detection sensor (e.g., a time of flight (TOF) sensor or a light detection and ranging (LiDAR)).

According to various embodiments, the electronic device 700 may further include an unillustrated sensor module, for example, at least one of an atmospheric sensor, a magnetic sensor, a biometric sensor, a temperature sensor, a humidity sensor, or a fingerprint recognition sensor. In an embodiment, the fingerprint recognition sensor may be disposed through at least one of the first side member 713 of the first housing 710 and/or the second side member 723 of the second housing 720.

According to various embodiments, the key input device 719 may be disposed to be exposed to the outside through the first side member 713 of the first housing 710. In an embodiment, the key input device 719 may be disposed to be exposed to the outside through the second side member 723 of the second housing 720. In an embodiment, the electronic device 700 may not include some or all of the key input device 719, and the unincluded key input device 719 may be implemented in another shape such as a soft key on the least one display 730 and 800. In another embodiment, the key input device 719 may be implemented by using a pressure sensor included in the at least one display 730 and 800.

According to various embodiments, the connector port 729 may include a connector (e.g., a USB connector or an IF module (an interface connector port module)) for transmitting or receiving data and/or power to and/or from an external electronic device. In an embodiment, the connector port 729 may perform a function of transmitting or receiving an audio signal to or from the external electronic device together, or may further include a separate connector port (e.g., an ear jack hole) for performing a function of transmitting or receiving an audio signal to or from the external electronic device.

According to various embodiments, at least one camera modules 716*a* and 725 of the camera modules 716*a*, 716*b*, and 725, at least one sensor module 717*a* and 726 of the sensor modules 717*a*, 717*b*, and 726, and/or an indicator may be arranged to be exposed through the at least one display 730 and 800. For example, the at least one camera modules 716*a* and 725, the at least one sensor module 717*a* and 726, and/or the indicator may be arranged under an activated area (a display area) of the at least one display 730 and 800 in a space in the at least one housing 710 and 720, and may be arranged to come into contact with an external environment through a transparent area or an opening that is perforated to a cover member (e.g., a window layer (not shown) of the first display 730 and/or the second rear cover 750). According to an embodiment, an area in which the at least one display 730 and 800 and the at least one camera module 716*a* and 725 face each other may be formed as a transmission area having a predetermined transmission ratio, as a part of an area in which a content is displayed. According to an embodiment, the transmission area may be formed to have a transmission ratio in the range of about 5% to about 20%. The transmission area may include an area overlapping with an effective area (e.g., an angle of view area) of the at least one camera module 716*a* and 725, wherein an image is formed on the image sensor in the effective area, and light for generating an image passes through the effective area. For example, the transmission area of the display 730 and 800 may include an area in which the density of a pixel is lower than that in a surrounding area. For example, the transmission area may be replaced with an opening. For example, the at least one camera module 716*a* and 725 may include an under-display camera (UDC) or an under-panel camera (UPC). In another embodiment, some camera modules or sensor modules 271*a* and 726 may be arranged to perform functions thereof without being visually exposed through the display. For example, an area facing the sensor module 717*a* and 726 and/or the camera module 716*a* and 725 arranged under the display 730 and 800 (e.g., a display panel) corresponds to an under-display camera (UDC) structure, and a perforated opening is not necessarily required.

FIG. 12 is an exploded perspective view of an electronic 700 according to various embodiments of the disclosure.

Referring to FIG. 12, an electronic device 700 may include a first display 730 (e.g., the display module 730), a second display 800, a hinge device 900, a pair of support members 761 and 762, at least one substrate 270 (e.g., a printed circuit board (PCB)), a first housing 710, a second housing 720, a first rear cover 740, and/or a second rear cover 750.

According to an embodiment, the first display 730 may include a display panel 930 (e.g., a flexible display panel), a support plate 950 disposed under the display panel 930, and a pair of reinforcement plates 9621 and 9622 disposed below the support plate 950. According to one embodiment, the display panel 930 may include a first panel area 930*a* corresponding to a first area (e.g., the first area 730*a* in FIG. 10A) of the first display 730, a second panel area 930*b* extending from the first panel area 930*a* and corresponding to a second area (e.g., the second area 730*b* in FIG. 10A) of the first display 730, and a third panel area 930*c* which connects the first panel area 930*a* and the second panel area 930*b* and corresponds to a folding area (e.g., the folding area 730*c* in FIG. 10A) of the first display 730. According to an embodiment, the support plate 950 may be disposed between the display panel 930 and the a pair of support members 761 and 762, and may be formed to have a material and a shape for providing a planar support member for the first panel area 930*a* and the second panel area 930*b*, and a bendable structure for helping the flexibility of the third panel area 930*c*. According to an embodiment, the support plate 950 may be formed of a conductive material (e.g., metal) or a non-conductive material (e.g., polymer or fiber reinforced plastics (FRP)). According to an embodiment, the a pair of the reinforcement plates 9621 and 9622, between the support plate 950 and the a pair of the support members 761 and 762, may include a first reinforcement plate 9621 disposed to correspond to at least a part of the first panel area 930*a* and the third panel area 930*c*, and a second reinforcement plate 9622 disposed to correspond to at least a part of the second panel area 930*b* and the third panel area 930*c*. According to an embodiment, the a pair of the reinforcement plates 9621 and 9622 may be formed of a metal material (e.g., SUS) in order to help a ground connection structure and rigidity reinforcement for the first display 730.

According to an embodiment, the second display 800 may be disposed in a space between the second housing 720 and the second rear cover 750. According to an embodiment, the second display 800 may be disposed to be visible from the outside through substantially the entire area of the second rear cover 750 in the space between the second housing 720 and the second rear cover 750.

According to an embodiment, at least a part of the first support member 761 may be foldably coupled to the second support member 762 through the hinge device 900. According to an embodiment, the electronic device 700 may include at least one wire member 780 (e.g., a flexible circuit board (FPCB)) which is disposed from at least a part of the first support member 761 to a part of the second support member 762 while crossing the hinge device 900. According to an embodiment, the first support member 761 may be disposed in a manner of extending from the first lateral member 713 or structurally coupling to the first lateral member 713. According to an embodiment, the electronic device 700 may include a first space (e.g., the first space 7101 in FIG. 10A) provided through the first support member 761 and the first rear cover 740. According to an embodiment, the first housing 710 (e.g., a first housing structure) may be configured through a combination of the first lateral member 713, the first support member 761, and the first rear cover 740. According to an embodiment, the second support member 762 may be disposed in a manner of extending from the second lateral member 723 or structurally coupling to the second lateral member 723. According to an embodiment, the electronic device 700 may include a second space (e.g., the second space 7201 in FIG. 10A) provided through the second support member 762 and the second rear cover 750. According to an embodiment, the second housing 720 (e.g., a second housing structure) may be configured through a combination of the second lateral member 723, the second support member 762, and the second rear cover 750. According to an embodiment, the at least one wire member 780 and/or at least a part of the hinge device 900 may be disposed to be supported by at least a part of the a pair of the support members 761 and 762. According to an embodiment, the at least one wire member 780 may be disposed in a direction (e.g., the x-axis direction) crossing the first support member 761 and the second support member 762. According to an embodiment, the at least one wire member 780 may be disposed in a direction (e.g., the x-axis direction) substantially perpendicular to a folding axis (e.g., the y-axis or the folding axis F in FIG. 10A).

According to an embodiment, the at least one substrate 270 may include a first substrate 771 disposed in the first space 7101, and a second substrate 772 disposed in the second space 7201. According to an embodiment, the first substrate 771 and the second substrate 772 may include multiple electronic components arranged in order to implement various functions of the electronic device 700. According to an embodiment, the first substrate 771 and the second substrate 772 may be electrically connected to each other through the at least one wire member 780. In an embodiment, a camera module 782 may be disposed on the first substrate 771.

According to an embodiment, the electronic device 700 may include at least one battery 791 or 792. According to an embodiment, the at least one battery 791 and 792 may include a first battery 791 disposed in the first space 7101 of the first housing 710 and electrically connected to the first substrate 771, and a second battery disposed in the second space 7201 of the second housing 720 and electrically connected to the second substrate 772. According to an embodiment, the first support member 761 and the second support member 762 may further include at least one swelling hole for the first battery 791 and one swelling hole for the second battery 792.

According to an embodiment, the first housing 710 may include a first rotation support surface 714, and the second housing 720 may include a second rotation support surface 724 corresponding to the first rotation support surface 714. According to an embodiment, the first rotation support surface 714 and the second rotation support surface 724 may include a curved-surface corresponding to (naturally connected to) a curve-shaped outer surface of the hinge housing 810. According to an embodiment, in case that the electronic device 700 is in an unfolded state, the first rotation support surface 714 and the second rotation support surface 724 may cover the hinge housing 810, to prevent the hinge housing 810 from being exposed to the rear surface of the electronic device 700 or to allow only a part of the hinge housing to be exposed thereto. According to an embodiment, in case that the electronic device 700 is in a folded state, the first rotation support surface 714 and the second rotation support surface 724 may be configured such that the curved shape of the hinge housing 810 rotates along outer surfaces thereof and thus at least a part of the hinge housing 810 is exposed to the rear surface of the electronic device 700.

According to an embodiment, the electronic device 700 may include at least one antenna 776 positioned inside the first space 7101. According to an embodiment, the at least one antenna 776 may be disposed on the first battery 791 and the first rear cover 740, in the first space 7101. According to an embodiment, for example, the at least one antenna 776 may include a near field communication (NFC) antenna, a wireless charging antenna, and/or a magnetic secure transmission (MST) antenna. According to an embodiment, for example, the at least one antenna 776 may perform a short-range communication with an external device, or may wirelessly transmit or receive power required for charging. In some embodiments, an antenna structure may be formed by at least a part of the first lateral member 713 or the second lateral member 723 and/or a part of the first support member 761 and the second support member 762 or a combination thereof According to an embodiment, the electronic device 700 may also further include at least one electronic component assembly 774 or 775 and/or additional support members 763 and 773, which are arranged in the first space 7101 and/or the second space 7201. For example, the at least one electronic component assembly may include an interface connector port assembly 774 or a speaker assembly 775.

According to an embodiment, the electronic device 100 may include a first waterproof structure WP1 (a first waterproof structure) disposed between the first reinforcement plate 9621 and the first support member 761, and a second waterproof structure WP2 (a second waterproof structure) disposed between the second reinforcement plate 9622 and the second support member 762. Between the first reinforcement plate 9621 and the first support member 761, the first waterproof structure WP1 may include a first waterproof member disposed to allow at least one first waterproof space to be formed therein. According to an embodiment, between the second reinforcement plate 9622 and the second support member 762, the second waterproof structure WP2 may include a second waterproof member, a third waterproof member, and a fourth waterproof member which are arranged such that at least one second waterproof space is formed. According to an embodiment, the fourth waterproof member may be disposed to connect spaces of the second waterproof member and the third waterproof member, which have a height difference and are spaced apart from each other.

According to an embodiment, the at least one first waterproof space may be disposed to accommodate a penetration passage of a connection member (e.g., the first connection member in FIG. 12 or a flexible printed circuit board (FPCB$_{[Jsa1]}$)) which is a wire structure for connecting an electronic component (e.g., the first digitizer panel 471) disposed between the first reinforcement plate 9621 and the first support member 762 to the first space 7101, through the first waterproof member. According to an embodiment, the at least one second waterproof space may be disposed to accommodate a penetration passage of a connection member (e.g., the second connection member in FIG. 12) which is a wire structure for connecting an electronic component (e.g., the second digitizer panel 472) disposed between the second reinforcement plate 9622 and the second support member 762 to the second space 7201, through the second waterproof member, the third waterproof member, and the fourth waterproof member. According to an embodiment, the at least one first waterproof space may accommodate an area corresponding to at least one electronic component (e.g., a camera module or a sensor module) disposed to be supported by the first support member 761. According to an embodiment, the at least one second waterproof space may accommodate at least a part of a bending part (e.g., the bending part) which is folded to the rear surface of the first display 730. For example, the at least one second waterproof space may be disposed to extend from a display panel (e.g., the display panel 930 in FIG. 12) of the first display 730 and to surround at least a part of the bending part folded to the rear surface thereof. Accordingly, a control circuit (e.g., the control circuit) and multiple electrical elements (not shown), which are arranged in the bending part, may be disposed in the at least one second waterproof space, and thus may be protected from external moisture and/or foreign substances.

In the electronic device 700 according to an exemplary embodiment of the disclosure, the at least one waterproof member may include the at least one waterproof structure WP1 or WP2 which is disposed between the first reinforcement plate 9621 and the first support member 761 of the first housing 710 and/or the second reinforcement plate 9622 and the second support member 762 of the second housing 720. Therefore, in case that the first display 730 is separated from the housings 710 and 720 in order for maintenance of the electronic device 700, damage of the first display can be reduced by the waterproof member. In addition, since the at least one waterproof member is disposed to avoid the rear surface of the first display 730, external visibility can be improved, and the surface quality thereof can be secured.

According to an embodiment, the structure illustrated in FIG. 4 to FIG. 9B may be a configuration or a structure applied to the electronic device 700. In an embodiment, the structure or the configuration described through FIG. 4 to FIG. 9B may be a configuration or a structure applied to at least one of the first housing 710 and/or the second housing 720 of the electronic device 700. For example, the configuration of the electronic device 400 in FIG. 4 may be a configuration of the folded or the unfolded electronic device 700 in FIG. 11A to FIG. 13. Therefore, the descriptions of the first sound hole 510, the second sound hole 520, the sound output module 450, the sound outlet 540, and the sound guide part 550 described in FIG. 1. to FIG. 9B may also be identically applied to the electronic device 700 in FIG. 11A to FIG. 13.

Figure 13:
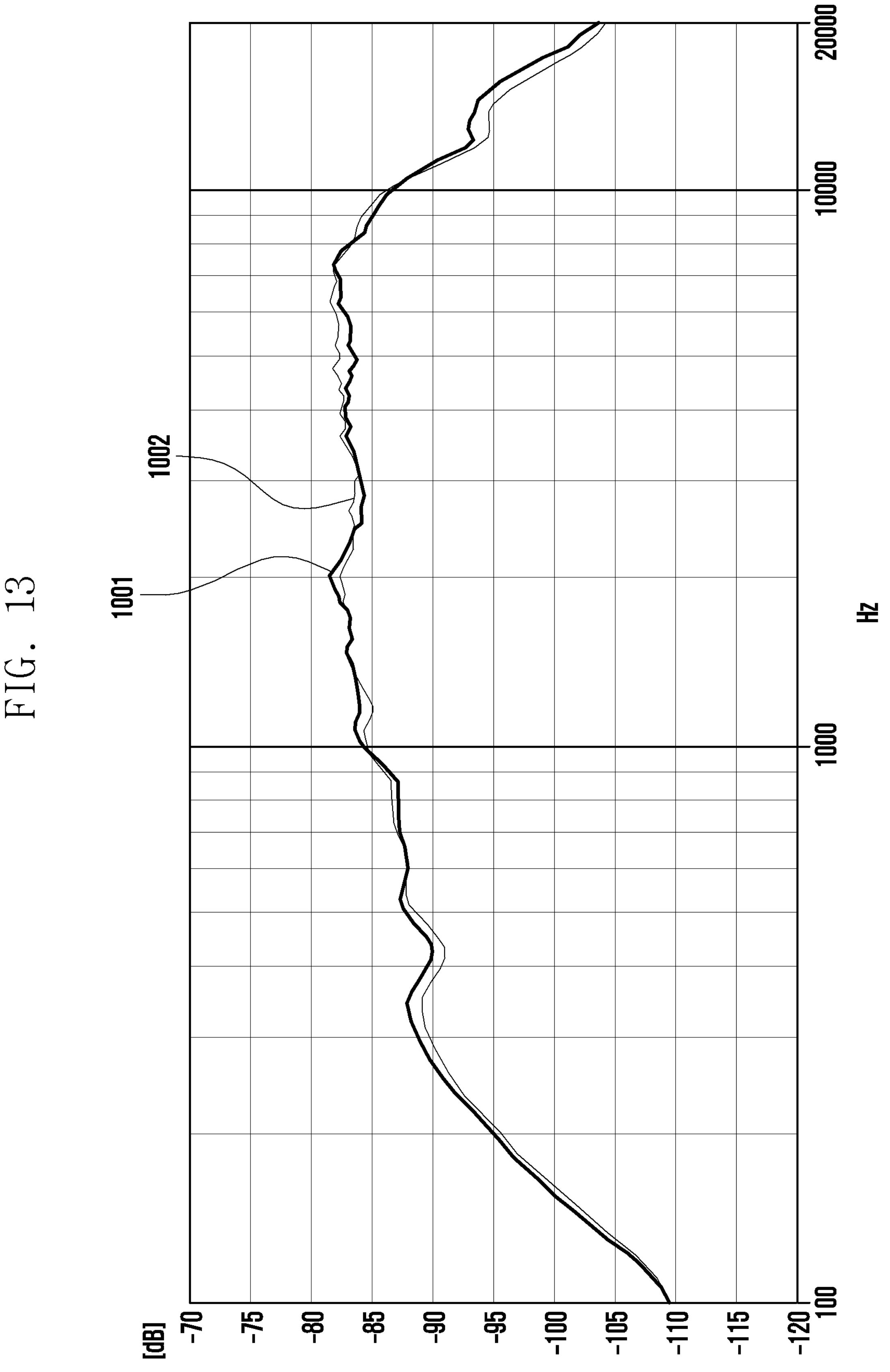
FIG. 13 is a view showing the speaker performance of a sound output module according to an embodiment of the disclosure.

FIG. 13 is a view showing the speaker performance of a sound output module according to an embodiment of this disclosure. In an embodiment, referring to FIG. 13, the speaker performance of the sound output module 450 of this disclosure may be identified. A first graph 1001 shows the speaker performance of the sound output module 450 of this disclosure. A second graph 1002 shows the speaker performance of an electronic device in which a speaker module (not shown) used for a speaker function and a receiver module (not shown) used for a receiver function are separately arranged. An electronic device corresponding to the second graph 1002 may include a speaker hole through which the speaker sound emitted from a speaker module is emitted to the outside of the electronic device, and may include a receiver hole through which the receiver sound emitted from a receiver module is emitted to the outside of the electronic device. The speaker module and the speaker hole, and the receiver module and receiver hole may be connected through separate conduits.

In an embodiment, the speaker sound generated by the sound output module 450 may be emitted to the outside of the electronic device 400 through the first sound hole 510 and the second sound hole 520. As sound is emitted to the outside of the electronic device 400 through multiple passages (e.g., the first sound hole 510 and the second sound hole 520), the stereo performance of a speaker can be improved.

Meanwhile, according to an embodiment of the disclosure, a plurality of holes constituting the first sound hole 510 may have an expandable width. As the widths of the plurality of holes constituting the first sound hole 510 increase, the intensity of sound emitted through the first sound hole 510 may be increased. The increase in the volume of the sound passage according to the expansion of the width of the first sound hole 510 may be offset through the dummy member 620 described above.

As described above, in the electronic device 400 according to an embodiment of the disclosure, the speaker sound generated in the sound output module 450 may be emitted to the outside of the electronic device 400 through the first sound hole 510 and the second sound hole 520, and the speaker performance thereof may be improved by expanding the width of the first sound hole 510. Therefore, according to the disclosure, the speaker performance (see 1001) of the sound output module 510 for emitting the speaker sound and the receiver sound may be similar to the speaker performance (see 1002) of the sound output module for emitting only the speaker sound. Therefore, the electronic device 400 of the disclosure may replace multiple sound output modules with the sound output module 450 for performing multiple functions, and accordingly, the mounting structure of the electronic device 400 can be improved.

An electronic device 400 (e.g., the electronic device 101 illustrated in FIG. 1, the electronic device 200 illustrated in FIG. 2A and FIG. 2B, and/or the electronic device 300 illustrated in FIG. 3) according to an embodiment of the disclosure may include a housing 410, a camera module 440 (e.g., the camera module 180 in FIG. 1) disposed in the housing, a sound output module 450 (e.g., the sound output module 155 in FIG. 1) disposed in the housing to be spaced apart from the camera module, a first sound hole 510 (e.g., the sound hole 214 or 207 in FIG. 2A) positioned on the front surface of the electronic device, a second sound hole 520 (e.g., the sound hole 214 or 207 in FIG. 2A) which is positioned on a side surface of the electronic device and includes a dummy hole 521 disposed to be adjacent to the sound output module and at least partially closed, and a connection hole 522 spaced farther apart from the sound output module than the dummy hole, a sound outlet 540 formed through the housing to allow sound generated in the sound output module to be output and connected to the first sound hole and the second sound hole, and a sound guide part 550 formed in the housing along a direction in which the first sound hole and the second sound hole extend, and configured to connect the sound outlet, the first sound hole, and the second sound hole.

In addition, at least a part of the sound output module and the dummy hole may be positioned in a first direction (e.g., the −X-axis direction based on FIG. 6A) with respect to an imaginary first axis (e.g., the first axis illustrated in FIG. 6A or the Y-axis based on FIG. 6A) passing between the dummy hole and the connection hole, and the connection hole may be positioned in a second direction (e.g., the +X-axis direction based on FIG. 6A) opposite to the first direction with respect to the first axis.

The connection hole of the second sound hole may include a hole configured to connect the outside and the inside of the electronic device, and the dummy hole of the second sound hole may include a groove concavely formed on a side surface of the housing.

A shield member 610 configured to close the dummy hole of the second sound hole may be further included therein.

The shield member may include a shield part 611 configured to close the dummy hole and an opening 612 configured to connect the sound outlet and the sound guide part.

A lateral frame 411, of which at least a part constitutes a side exterior of the electronic device and through which the second sound hole is formed, may be included therein.

The sound guide part may be a space formed through the lateral frame and the support member 412 disposed in the housing.

Multiple holes constituting each of the first sound hole and the second sound hole may be formed to have substantially the same width.

A penetration part 560 formed from the rear surface of the housing toward the front surface of the housing and connected to the sound guide part, and a soundproof member 570 configured to cover the penetration part on the rear surface of the housing may be further included therein.

The sound guide part is formed by a machining tool which is inserted through the penetration part and is moved in the housing in the width direction of the electronic device.

A dummy member 620 disposed in at least a part of the penetration part so as to reduce the volume of the sound guide part may be further included therein.

A display module 430 disposed in the housing may be further included therein, the display module may include a camera hole 431 configured to allow light to be incident on a lens of the camera module, and the center of the second sound hole may be aligned with the camera hole.

A display module 430 disposed in the housing may be further included therein, and the first sound hole may include a hole formed in a slit shape between the display module and the housing.

Each of the first sound hole and the second sound hole may include multiple holes, and the multiple holes may be arranged in a direction parallel to the width direction of the electronic device.

A sound-emitting structure of an electronic device 400 (e.g., the electronic device 101 illustrated in FIG. 1, the electronic device 200 illustrated in FIG. 2A and FIG. 2B, and/or the electronic device 300 illustrated in FIG. 3) according to an embodiment of the disclosure may include a sound output module 450 (e.g., the sound output module 155 in FIG. 1) disposed in the housing to be spaced apart from a camera module 440 (e.g., the camera module 180 in FIG. 1) disposed in the housing 410 of the electronic device, a first sound hole 510 (e.g., the sound hole 214 or 207 in FIG. 2A) positioned on the front surface of the electronic device, a second sound hole 520 which is positioned on a side surface of the electronic device and includes a dummy hole 521 disposed to be adjacent to the sound output module and at least partially closed, and a connection hole 522 spaced farther apart from the sound output module than the dummy hole, a sound outlet 540 formed through the housing to allow sound generated in the sound output module to be output and connected to the first sound hole and the second sound hole, and a sound guide part 550 formed in the housing along a direction in which the first sound hole and the second sound hole extend, and configured to connect the sound outlet, the first sound hole, and the second sound hole.

In addition, at least a part of the sound output module and the dummy hole may be positioned in a first direction with respect to an imaginary first axis (e.g., the first axis illustrated in FIG. 6A or the Y-axis based on FIG. 6A) passing between the dummy hole and the connection hole, and the connection hole may be positioned in a second direction opposite to the first direction with respect to the first axis.

In addition, the connection hole of the second sound hole may include a hole configured to connect the outside and the inside of the electronic device, and the dummy hole of the second sound hole may include a groove concavely formed on a side surface of the housing.

In addition, a shield member 610 configured to close the dummy hole of the second sound hole may be further included therein.

In addition, the shield member may include a shield part 611 configured to close the dummy hole and an opening 612 configured to connect the sound outlet and the sound guide part.

In addition, a lateral frame 411, of which at least a part constitutes a side exterior of the electronic device and through which the second sound hole is formed, may be included therein, and the sound guide part may be a space formed through the lateral frame and a support member 412 disposed in the housing.

In addition, multiple holes constituting each of the first sound hole and the second sound hole may be formed to have substantially the same width.

In addition, a penetration part 560 formed from the rear surface of the housing toward the front surface of the housing and connected to the sound guide part, a soundproof member 570 configured to cover the penetration part on the rear surface of the housing, and a dummy member 620 disposed in at least a part of the penetration part so as to reduce the volume of the sound guide part may be further included therein.

According to various embodiments of this disclosure, it may be reduced that when calling, call sound generated in the sound output module 450 is emitted through the second sound hole 520 in addition to the first sound hole 510. In addition, in case that a speaker function is used according to application execution, sound generated in the sound output module 450 may be emitted through the first sound hole 510 and the second sound hole 520. Therefore, the radiation performance of a speaker can be improved.

What is claimed is:

1. An electronic device comprising:
- a housing;
- a camera module disposed on the housing; and
- a sound output module disposed on the housing, the sound output module being spaced apart from the camera module,
- wherein the housing comprises:
  - a first sound hole positioned on a front surface of the electronic device;
  - a second sound hole which is positioned on a side surface of the electronic device and comprises a dummy hole that is disposed adjacent to the sound output module and is at least partially closed, and a connection hole spaced farther apart from the sound output module than the dummy hole;
  - a sound outlet formed on a portion of the housing to allow sound generated in the sound output module to be output therethrough, the sound outlet being connected to both the first sound hole and the second sound hole;
  - a sound guide portion formed on a portion of the housing along a direction in which the first sound hole and the second sound hole extend, the sound guide portion being configured to connect the sound outlet to both the first sound hole and the second sound hole; and
  - a penetration hole formed from a rear surface of the housing that extends towards the front surface of the housing and is connected to the sound guide portion, and
- wherein the electronic device further comprises a soundproof member that covers the penetration hole on the rear surface of the housing.

2. The electronic device of claim 1, wherein at least a portion of the sound output module and the dummy hole are positioned in a first direction with respect to a first axis, and
- wherein the connection hole is positioned in a second direction opposite to the first direction with respect to the first axis.

3. The electronic device of claim 1, wherein the connection hole of the second sound hole further comprises a hole configured to connect the outside and the inside of the electronic device, and
- wherein the dummy hole of the second sound hole comprises a groove concavely formed on a side surface of the housing.

4. The electronic device of claim 1, further comprising a shield member disposed in the sound guide portion and configured to close the dummy hole of the second sound hole.

5. The electronic device of claim 4, wherein the shield member comprises a shield portion configured to close the dummy hole.

6. The electronic device of claim 1, further comprising:
- a lateral frame, of which at least a part constitutes a side exterior of the electronic device and through which the second sound hole is formed.

7. The electronic device of claim 6, wherein the sound guide portion is formed through the lateral frame and a support member disposed in the housing.

8. The electronic device of claim 1, wherein the first sound hole and the second sound hole comprise a plurality of holes,
- wherein the plurality of holes are formed to have substantially the same width.

9. The electronic device of claim 1, wherein the sound guide portion is formed by a machining tool which is inserted through the penetration hole and is moved throughout the housing in a width direction of the electronic device.

10. The electronic device of claim 1, further comprising a dummy member disposed in at least a portion of the penetration hole so as to reduce a volume of the sound guide portion.

11. The electronic device of claim 1, further comprising a display module disposed in the housing,
- wherein the display module comprises a camera hole configured to allow light to be incident on a lens of the camera module, and
- wherein a center of the second sound hole is aligned with the camera hole on an axis.

12. The electronic device of claim 1, further comprising a display module disposed in the housing,
- wherein the first sound hole further comprises a hole formed in a slit shape between the display module and the housing.

13. The electronic device of claim 1, wherein each of the first sound hole and the second sound hole comprises a plurality of holes, and
- wherein the plurality of holes are arranged in a direction parallel to a width direction of the electronic device.

14. A sound-emitting structure of an electronic device, comprising:

a sound output module disposed inside of a housing, the sound output module being spaced apart from a camera module disposed inside of the housing of the electronic device;

a first sound hole positioned on a front surface of the electronic device;

a second sound hole which is positioned on a side surface of the electronic device, and the second sound hole comprises a dummy hole that is adjacent to the sound output module and is at least partially closed, and a connection hole spaced farther apart from the sound output module than the dummy hole;

a sound outlet formed through the housing to allow sound generated in the sound output module to be output therethrough, the sound outlet being connected to both the first sound hole and the second sound hole;

a sound guide portion formed in the housing along a direction in which the first sound hole and the second sound hole extend, the sound guide portion being configured to connect the sound outlet to both the first sound hole and the second sound hole;

a penetration hole formed from a rear surface of the housing that extends towards the front surface of the housing and is connected to the sound guide portion; and a soundproof member that covers the penetration hole on the rear surface of the housing.

15. The sound-emitting structure of claim 14, wherein at least a portion of the sound output module and the dummy hole are positioned in a first direction with respect to a first axis, and wherein the connection hole is positioned in a second direction opposite to the first direction with respect to the first axis.

16. The sound-emitting structure of claim 14, wherein the connection hole of the second sound hole further comprises a hole configured to connect the outside and the inside of the electronic device, and wherein the dummy hole of the second sound hole comprises a groove concavely formed on a side surface of the housing.

17. The sound-emitting structure of claim 14, further comprising a shield member configured to close the dummy hole of the second sound hole, wherein the shield member comprises a shield portion configured to close the dummy hole.

18. The sound-emitting structure of claim 14, further comprising:

a lateral frame, of which at least a part constitutes a side exterior of the electronic device and through which the second sound hole is formed, wherein the sound guide portion is a space formed through the lateral frame and a support member disposed in the housing.

19. The sound-emitting structure of claim 14, further comprising:

a dummy member disposed in at least a portion of the penetration hole so as to reduce a volume of the sound guide portion.

20. An electronic device comprising:

a housing;

a camera module disposed on the housing; and a sound output module disposed on the housing, the sound output module being spaced apart from the camera module;

wherein the housing comprises:

a first sound hole positioned on a front surface of the electronic device;

a second sound hole which is positioned on a side surface of the electronic device and comprises a dummy hole that is disposed adjacent to the sound output module and is at least partially closed, and a connection hole spaced farther apart from the sound output module than the dummy hole;

a sound outlet formed on a portion of the housing to allow sound generated in the sound output module to be output therethrough, the sound outlet being connected to both the first sound hole and the second sound hole; and a sound guide portion formed on a portion of the housing along a direction in which the first sound hole and the second sound hole extend, the sound guide portion being configured to connect the sound outlet to both the first sound hole and the second sound hole, and wherein the electronic device further comprises a shield member disposed in the sound guide portion, the shield member comprising a shield portion configured to close the dummy hole of the second sound hole.

* * * * *